United States Patent
Harada et al.

(10) Patent No.: US 10,020,504 B2
(45) Date of Patent: Jul. 10, 2018

(54) ACTIVE MATERIAL, NONAQUEOUS ELECTROLYTE BATTERY, BATTERY PACK, AND VEHICLE

(71) Applicant: KABUSHIKI KAISHA TOSHIBA, Minato-ku (JP)

(72) Inventors: Yasuhiro Harada, Isehara (JP); Norio Takami, Yokohama (JP); Yorikazu Yoshida, Yokohama (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 150 days.

(21) Appl. No.: 15/262,242

(22) Filed: Sep. 12, 2016

(65) Prior Publication Data
US 2017/0077511 A1 Mar. 16, 2017

(30) Foreign Application Priority Data
Sep. 16, 2015 (JP) .................. 2015-182915

(51) Int. Cl.
*H01M 4/131* (2010.01)
*H01M 4/485* (2010.01)
(Continued)

(52) U.S. Cl.
CPC ......... *H01M 4/485* (2013.01); *B60L 11/1864* (2013.01); *C01G 23/005* (2013.01); *C01G 33/006* (2013.01); *H01M 2/1077* (2013.01); *H01M 2/348* (2013.01); *H01M 4/131* (2013.01); *H01M 10/44* (2013.01); *H01M 10/486* (2013.01); *H02J 7/0026* (2013.01); *C01P 2002/76* (2013.01); *C01P 2002/77* (2013.01); *C01P 2002/88* (2013.01); *C01P 2006/40* (2013.01); *H01M 2220/20* (2013.01)

(58) Field of Classification Search
None
See application file for complete search history.

(56) References Cited

U.S. PATENT DOCUMENTS

2012/0107692 A1 5/2012 Harada et al.
2012/0328930 A1 12/2012 Inagaki et al.
(Continued)

FOREIGN PATENT DOCUMENTS

EP 2 448 054 A1 5/2012
JP 2010-287496 A 12/2010
(Continued)

OTHER PUBLICATIONS

Extended European Search Report dated Nov. 14, 2016 in Patent Application No. 16188310.3.
(Continued)

*Primary Examiner* — Sarah A. Slifka
*Assistant Examiner* — Haroon S. Sheikh
(74) *Attorney, Agent, or Firm* — Oblon, McClelland, Maier & Neustadt, L.L.P.

(57) ABSTRACT

According to one embodiment, an active material including a composite oxide is provided. The composite oxide is represented by a general formula $Li_xM1_{4-y}Ti_{10-z}M2_{2+z}O_{27+\delta}$. Here, M1 includes at least one selected from the group consisting of Na, K, and Cs. M2 includes at least one selected from the group consisting of Zr, Sn, V, Nb, Ta, Mo, W, Fe, Co, Mn, Ni, and Al. x satisfies $0 \leq x < 18$. y satisfies $0 < y < 4$. z satisfies $0 < z < 4$. $\delta$ satisfies $-0.3 \leq \delta \leq 0.3$.

12 Claims, 6 Drawing Sheets

(51) Int. Cl.
| | |
|---|---|
| *H01M 10/48* | (2006.01) |
| *H01M 2/34* | (2006.01) |
| *H01M 10/44* | (2006.01) |
| *H01M 2/10* | (2006.01) |
| *B60L 11/18* | (2006.01) |
| *H02J 7/00* | (2006.01) |
| *C01G 23/00* | (2006.01) |
| *C01G 33/00* | (2006.01) |

(56) References Cited

U.S. PATENT DOCUMENTS

2014/0044997 A1  2/2014  Inagaki et al.
2014/0295282 A1  10/2014  Harada et al.

FOREIGN PATENT DOCUMENTS

| JP | 2014-157836 A | 8/2014 |
| JP | 5586532 B2 | 9/2014 |
| JP | 2015-111585 A | 6/2015 |

OTHER PUBLICATIONS

Piyush R. Das, et al., "Diffuse ferroelectric phase transition in $Na_2Pb_2Nd_2W_2Ti_4Nb_4O_{30}$ ceramic." Journal of Alloys and Compounds, vol. 448, (2008), pp. 32-37.

R. R. Neurgaonkar, et al., "Ferroelectric Properties of the Tungsten Bronze $M^{2+}_6M^{4+}_2Nb_8O_{30}$ Solid Solution Systems," Materials Research Bulletin, vol. 27, No. 6, (1992), pp. 677-684.

A. Grandin, et al., "Topotactic dehydration of the lamellar oxide $HK_2Ti_5Nb_{O14}$ $H_2O$: The Oxide $K_4Ti_{10}Nb_2O_{27}$", Journal of Solid State Chemistry, vol. 68, Jun. 1987 pp. 369-374.

R. Dominko, et al., "Reversible lithium inspection into $Na_2Ti_6O_{13}$ Structure", Electrochemistry Communications, vol. 8, Apr. 2006, pp. 673-677.

"Funmatsu X sen kaisetsu no Jissai", Reality of Powder X-Ray Analysis, X-Ray Analysis Investigation Conversazione, The Japan Society for Analytical Chemistry, Written and edited by Izumi nakai and Fujio Izumi, 2002, pp. 107-108 (with cover pages).

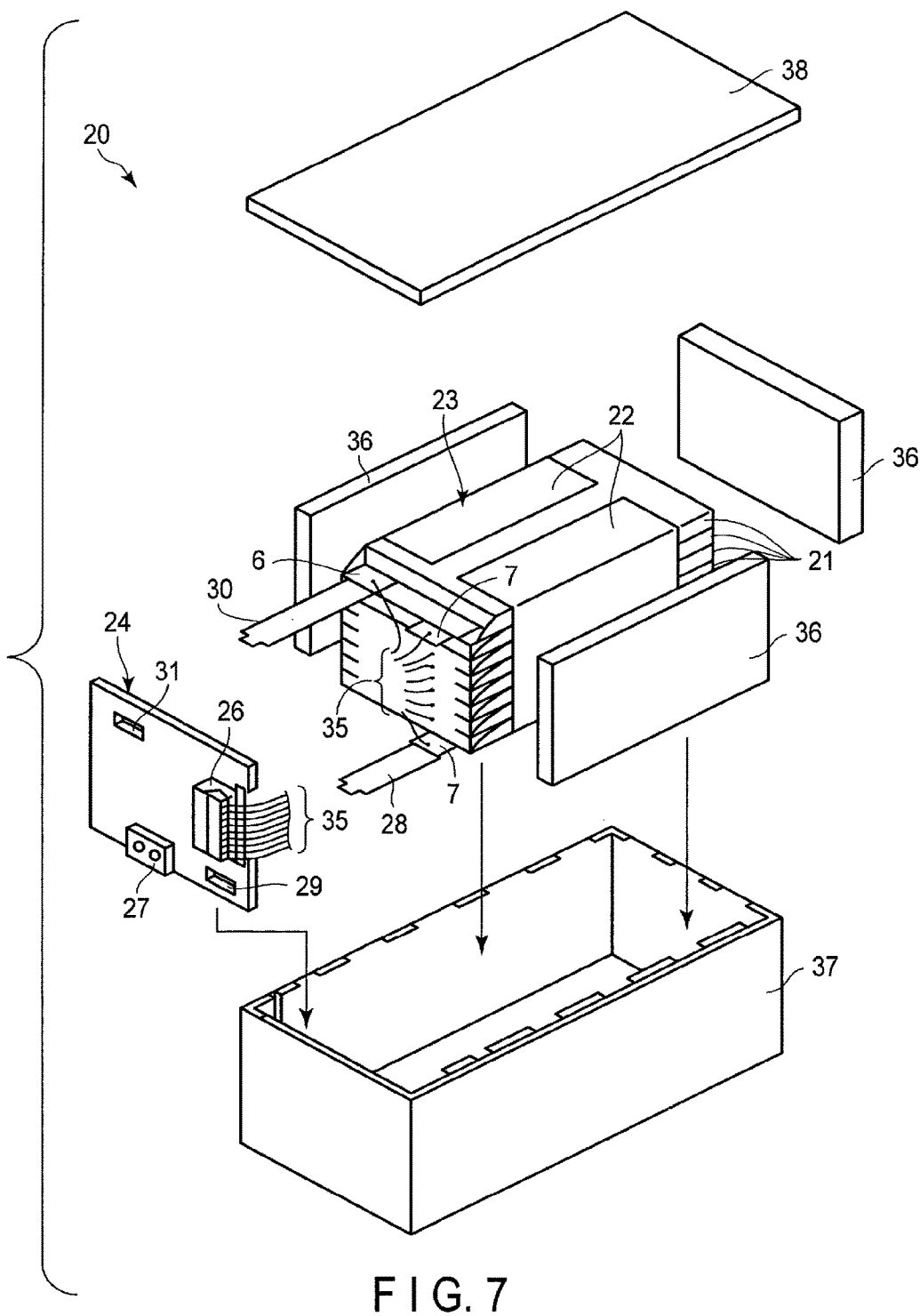
F I G. 7

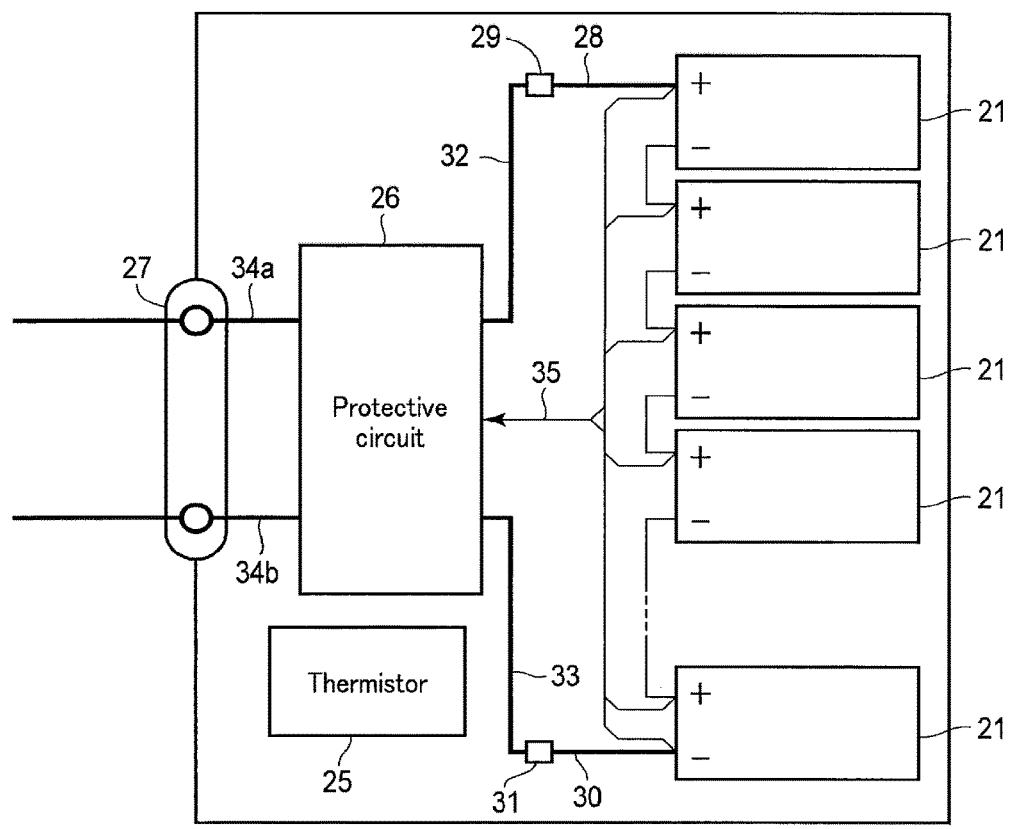
F I G. 8

ACTIVE MATERIAL, NONAQUEOUS ELECTROLYTE BATTERY, BATTERY PACK, AND VEHICLE

CROSS-REFERENCE TO RELATED APPLICATION

This application is based upon and claims the benefit of priority from Japanese Patent Application No. 2015-182915, filed Sep. 16, 2015; the entire contents of which are incorporated herein by reference.

FIELD

Embodiments described herein relate generally to an active material, nonaqueous electrolyte battery, battery pack, and vehicle.

BACKGROUND

Recently, a nonaqueous electrolyte battery such as a lithium ion secondary battery has been actively researched and developed as a high energy-density battery. The nonaqueous electrolyte battery is anticipated as a power source for vehicles such as hybrid automobiles, electric cars, an uninterruptible power supply for base stations for portable telephone, or the like. Attention is also paid on them as a battery for fixed power sources for applications such as averaging out the amount of electricity consumption between day and night or for smart grids. Therefore, the nonaqueous electrolyte battery is demanded to, in addition to having a high energy density, be excellent in other performances such as rapid charge-and-discharge performances and long-term reliability, as well. For example, a nonaqueous electrolyte battery capable of rapid charge and discharge has the benefit that charging time is remarkably short, and is able to improve motive performances in hybrid automobiles. Furthermore, the battery is also capable of efficiently recovering regenerative energy from motivity.

In order to enable rapid charge-and-discharge, electrons and lithium ions must be able to migrate rapidly between the positive electrode and the negative electrode. However, when a battery using a carbon-based negative electrode is repeatedly subjected to rapid charge-and-discharge, dendrite of metallic lithium may sometimes precipitate on the electrode. Dendrites cause internal short circuits, and as a result raise concern that heat generation or fires may occur.

In light of this, a battery using a metal composite oxide as a negative electrode active material in place of a carbonaceous material has been developed. In particular, in a battery using an oxide of titanium as the negative electrode active material, rapid charge-and-discharge can be stably performed. Such a battery also has a longer life than those using a carbon-based negative electrode.

However, compared to carbonaceous materials, oxides of titanium have a higher potential relative to metallic lithium. That is, oxides of titanium are more noble. Furthermore, oxides of titanium have a lower capacity per weight. Therefore, a battery using an oxide of titanium as the negative electrode active material has a problem that the energy density is lower. In particular, when a material having a high potential relative to metallic lithium is used as a negative electrode material, the voltage becomes lower than that of a battery using a carbonaceous material. Therefore, when such a material is used for systems requiring a high voltage such as an electric vehicle and a large-scale electric power storage system, there is a problem that the number of batteries connected in a series becomes large.

For example, the potential of the electrode using an oxide of titanium is about 1.5 V relative to metallic lithium and is higher (more noble) than that of the negative electrode with carbonaceous material. The potential of an oxide of titanium arises from the redox reaction between $Ti^{3+}$ and $Ti^{4+}$ upon electrochemical insertion and extraction of lithium, and is therefore electrochemically limited. It is therefore practically difficult to drop the potential of the electrode in order to improve the energy density.

BRIEF DESCRIPTION OF THE DRAWINGS

FIG. 7 is an exploded perspective view of a battery pack according to a third embodiment;

FIG. 8 is a block diagram showing an electrical circuit of the battery pack of FIG. 7.

DETAILED DESCRIPTION

Figure 1:
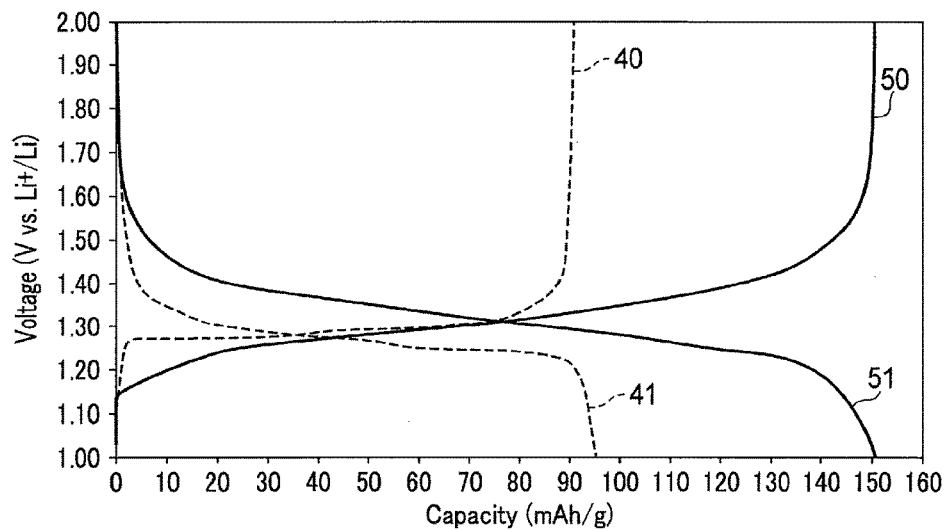
FIG. 1 is a graph showing charge-and-discharge curves of $Li_2Na_2Ti_6O_{14}$ and $Na_3Ti_9Nb_3O_{27}$.

According to one embodiment, an active material including a composite oxide is provided. The composite oxide is represented by a general formula $Li_xM1_{4-y}Ti_{10-z}M2_{2+z}O_{27+\delta}$. Here, M1 includes at least one selected from the group consisting of Na, K, and Cs. M2 includes at least one selected from the group consisting of Zr, Sn, V, Nb, Ta, Mo, W, Fe, Co, Mn, Ni, and Al. x satisfies $0 \leq x < 18$. y satisfies $0 < y < 4$. z satisfies $0 < z < 4$. $\delta$ satisfies $-0.3 \leq \delta \leq 0.3$.

According to another embodiment, a nonaqueous electrolyte battery is provided. The nonaqueous electrolyte battery includes a negative electrode including the active material according to the embodiment, a positive electrode, and a nonaqueous electrolyte.

According to yet another embodiment, a battery pack is provided. The battery pack includes the nonaqueous electrolyte battery according to the embodiment.

According to still another embodiment, provided is a vehicle onto which the above battery pack is mounted.

Embodiments will be explained below with reference to the drawings. Structures common among the embodiments are represented by the same symbols and over-lapping explanations are omitted. Also, each drawing is a typical view for explaining the embodiments and for promoting an understanding of the embodiments. Though there are parts different from an actual device in shape, dimension and ratio, these structural designs may be properly changed taking the following explanations and known technologies into consideration.

First Embodiment

According to the first embodiment, a battery active material including a composite oxide having a monoclinic crystal structure is provided. The composite oxide is represented by a general formula $Li_xM1_{4-y}Ti_{10-z}M2_{2+z}O_{27+\delta}$. Here, M1 is at least one kind of element selected from Na, K, and Cs. M2 is at least one kind of element selected from the group consisting of Zr, Sn, V, Nb, Ta, Mo, W, Fe, Co, Mn, Ni, and Al. x falls within the range of $0 \leq x < 18$. y falls within the range of $0 < y < 4$. z falls within the range of $0 < z < 4$. $\delta$ falls within the range of $-0.3 \leq \delta \leq 0.3$.

The composite oxide included in the battery active material according to the first embodiment may correspond to a substituted oxide, in which a vacancy site is introduced into a portion of an M1 site, and at least a portion of Ti sites is substituted by the M2 element, in a composite oxide represented by $Li_xM1_4Ti_{10}M2_2O_{27+\delta}$ having a monoclinic crystal structure. A potential with respect to an oxidation-reduction potential of metallic lithium can be changed by changing a kind or amount of the M1 element in the crystal structure. Further, lithium ions can become easily inserted and extracted by forming a vacancy at the M1 site, so that the charge-and-discharge capacity can be further increased. In addition, the charge-and-discharge capacity of lithium ions can be changed by changing the kind of the M2 element in the crystal structure and the substitution amount of the M2 element substituting the Ti site.

The battery active material according to the first embodiment can have an average potential of lithium insertion within the range of 0.5 V to 1.45 V (vs. $Li/Li^+$) with respect to the oxidation-reduction potential of metallic lithium. Thereby, a nonaqueous electrolyte battery including in a negative electrode, the battery active material according to the first embodiment can exhibit a battery voltage higher than that of, for example a nonaqueous electrolyte battery including, in a negative electrode, a titanium composite oxide whose lithium insertion potential is 1.55 V (vs. $Li/Li^+$).

The battery active material according to the first embodiment can have many lithium ions be inserted and extracted within a potential range of 1.0 V to 1.45 V (vs. $Li/Li^+$). With reference to FIG. 1, the reason why the battery active material according to the first material can have a high capacity at a potential less than 1.55 V will be hereinafter described.

FIG. 1 shows charge-and-discharge curves (dashed lines) of a composite oxide $Li_2Na_2Ti_6O_{14}$ and charge-and-discharge curves (solid lines) of a composite oxide $Na_3Ti_9Nb_3O_{27}$ when a half cell is formed using metallic lithium as a counter electrode. The solid charge-and-discharge curves (discharge/Li extraction curve 50 and a charge/Li insertion curve 51) indicate potential change of the composite oxide $Na_3Ti_9Nb_3O_{27}$ having a monoclinic crystal structure. This composite oxide is a composite oxide that may be included in the battery active material according to the first embodiment. Meanwhile, the dashed charge-and-discharge curves (discharge/Li extraction curve 40 and a charge/Li insertion curve 41) indicate the potential change of the composite oxide $Li_2Na_2Ti_6O_{14}$. This composite oxide is a composite oxide represented by a general formula $Li_{2+w}Na_2Ti_6O_{14+\delta}$ having a monoclinic crystal structure. The composite oxide $Na_3Ti_9Nb_3O_{27}$ is a composite oxide obtained by forming a portion of Na sites into vacancies and substituting a portion of Ti sites by Nb in the crystal structure of a composite oxide $Na_4Ti_{10}Nb_2O_{27}$.

As shown in FIG. 1, in either one of the composite oxides, lithium ions can be inserted and extracted at an average voltage within the range of 1.25 V to 1.45 V (vs. $Li/Li^+$). However, the charge-and-discharge capacity of the composite oxide $Li_2Na_2Ti_6O_{14}$ is as low as approximately 95 mAh/g. Meanwhile, as shown in FIG. 1, the composite oxide $Na_3Ti_9Nb_3O_{27}$ can exhibit a high battery capacity value of 150 mAh/g.

The composite oxide which can be included in the battery active material according to the first embodiment is able to have many lithium ions be inserted and extracted at an operating potential of 1.55 V (vs. $Li/Li^+$) or less because the composite oxide has a large tunnel structure within the crystal structure. Next, the reason why this composite oxide has the large tunnel structure in the crystal structure will be explained.

The composite oxide, which can be included in the battery active material according to the first embodiment, is represented by a general formula $Li_xM1_{4-y}Ti_{10-z}M2_{2+z}O_{27+\delta}$. Here, M1 is at least one kind of element selected from Na, K, and Cs. M1 may be one of these elements or a combination of two or more of these elements. M2 is at least one kind of element selected from the group consisting of Zr, Sn, V, Nb, Ta, Mo, W, Fe, Co, Mn, Ni, and Al. M2 may be one of these elements or a combination of two or more of these elements. Here, x falls within the range of $0 \leq x < 18$, y falls within the range of $0 < y < 4$, z falls within the range of $0 < z < 4$, and $\delta$ falls within the range of $-0.3 \leq \delta \leq 0.3$.

Here, assuming that the M2 element occupying the M2 site includes $z_3$ mol of trivalent element, $z_4$ mol of tetravalent element, $z_5$ mol of pentavalent element, and $z_6$ mol of hexavalent element, a total valence of M2 is the sum: $(z_3 \times 3)+(z_4 \times 4)+(z_5 \times 5)+(z_6 \times 6)$ (here, $z_3+z_4+z_5+z_6=2+z$). The valence of the M2 element referred to herein is the valence in a state in which lithium ions are not electrochemically inserted in the composite oxide. For example, in a state in which a battery is completely discharged by a method to be described later, the composite oxide may be in a state in which lithium ions are not electrochemically inserted in the composite oxide. If the total valence of the M2 elements is greater than pentavalent (5+), vacancy can be introduced into the M1 site, and therefore favorable. In particular, if vacancy is introduced into the M1 site, charge repulsion at sites that may serve as a lithium host is reduced. Thus, the composite oxide becomes able to have a greater amount of lithium ions be inserted and extracted, and a high energy density and a high battery voltage can be exhibited. Furthermore, a nonaqueous electrolyte battery excellent in both rapid charge-and-discharge performances and life performance can be realized.

Next, the reason why the composite oxide, which may be included in the battery active material according to the first embodiment, can exhibit both a high rapid charge-and-discharge performances (rate performances) and an excellent life performance will be explained.

In the composite oxide $Li_2Na_2Ti_6O_{14}$, while the number of sites including Ti that serves as the framework of the crystal structure is 6, the number of oxide ions is 14. That is, in this composite oxide, the number of oxide ions relative to each one of the sites is 14/6, which is about 2.33. On the one hand, the composite oxide, which may be included in the battery active material according to the first embodiment, is represented by a general formula $Li_xM1_{4-y}Ti_{10-z}M2_{2+z}O_{27+\delta}$. In this composite oxide, while the total number of sites including Ti and M2 that serve as crystal framework is 12, the number of oxide ions is 27 (in the case where $\delta=0$). That is, in this composite oxide, the number of oxide ions relative to each one of the sites is 27/12, which is 2.25. On the other hand, in the case of $Na_2Ti_6O_{13}$ described in "Electrochemistry Communications, 8 (2006), 673-677," while the total number of sites including Ti serving as crystal framework is 6, the number of oxide ions is 13. In this case, the number of oxide ions relative to each one of the sites is 13/6, which is about 2.17.

As described above, even among similar crystal structures, the number of oxide ions with respect to the sites including Ti constructing the crystal framework is different. In general, when lithium ions move within a structure, the smaller the number of oxide ions, the smaller correlation between the lithium ions having a positive charge and the oxide ions having a negative charge. Thus, if the number of the oxide ions in the structure is reduced, movement of lithium ions within the structure becomes easy, and rate performance increases. On the other hand, since titanium ions constructing the framework have a positive charge also, the smaller the number of the oxide ions, the smaller correlation between the titanium ions and the oxide ions, as in the lithium ions. Thus, if the number of oxide ions in the structure is reduced, bonding strength between Ti and O is reduced, and stability of the crystal framework is lost. Thus, the life performance tends to become reduced. Accordingly, in order to keep the stability of the crystal structure while facilitating the movement of the lithium ions, it is not favorable for the number of the oxide ions to be excessively large or excessively small. Since the composite oxide $Li_xM1_{4-y}Ti_{10-z}M2_{2+z}O_{27+\delta}$ of the embodiment is well-balanced in the number of oxide ions, a crystal lattice can be stably maintained while movement of lithium ions is made smooth.

Subscript x in the general formula $Li_xM1_{4-y}Ti_{10-z}M2_{2+z}O_{27+\delta}$ for the composite oxide may change within the range of $0 \leq x < 18$ according to the state of charge of the composite oxide. For example, according to a production method described later, a composite oxide can be produced in which subscript x in the general formula is 0, for example. When the composite oxide in which subscript x is 0 is included as a negative electrode active material in a nonaqueous electrolyte battery, and the nonaqueous electrolyte battery is charged, x is increased to a value within the range of more than 0 and less than 18. Alternatively, by a method described later, for example, the composite oxide can also be synthesized with a raw material composition ratio controlled such that lithium amount x in the equation would be within the range of more than 0 and less than 18 before an initial charge. With the battery active material including the composite oxide in a state where lithium amount x is within the range of more than 0 and less than 18 before initial charge, the trapping of lithium ions in the structure during initial charge and discharge can be suppressed. As a result, an initial charge and discharge efficiency can be improved.

According to the above general formula, the amount of M1 in the crystal structure can be changed by changing a value of subscript y. As an example, when M1 includes Na, an average operating potential of an electrode can be adjusted in the range of 1.2 V to 1.5 V (vs. Li/Li$^+$) with respect to an oxidation-reduction potential of metallic lithium, according to the amount of Na in the crystal structure. That is, designing of the operating potential of the battery can be easily performed by controlling the value of the subscript y.

The composite oxide represented by the general formula $Li_xM1_{4-y}Ti_{10-z}M2_{2+z}O_{27+\delta}$ has a monoclinic crystal structure belonging to at least one of space groups C2, Cm, and C2/m, and lattice constants of $\underline{a}$ axis, b axis, and c axis preferably satisfy 16.0 Å$\leq a \leq$21.0 Å, 3.5 Å$\leq b \leq$4.5 Å, and 8.0 Å$\leq c \leq$13.0 Å, respectively. A crystal structure belonging to one of the above space groups may be included in the monoclinic crystal structure, or crystal structures belonging to two or more of the above space groups may be included in the monoclinic crystal structure.

Figure 2:
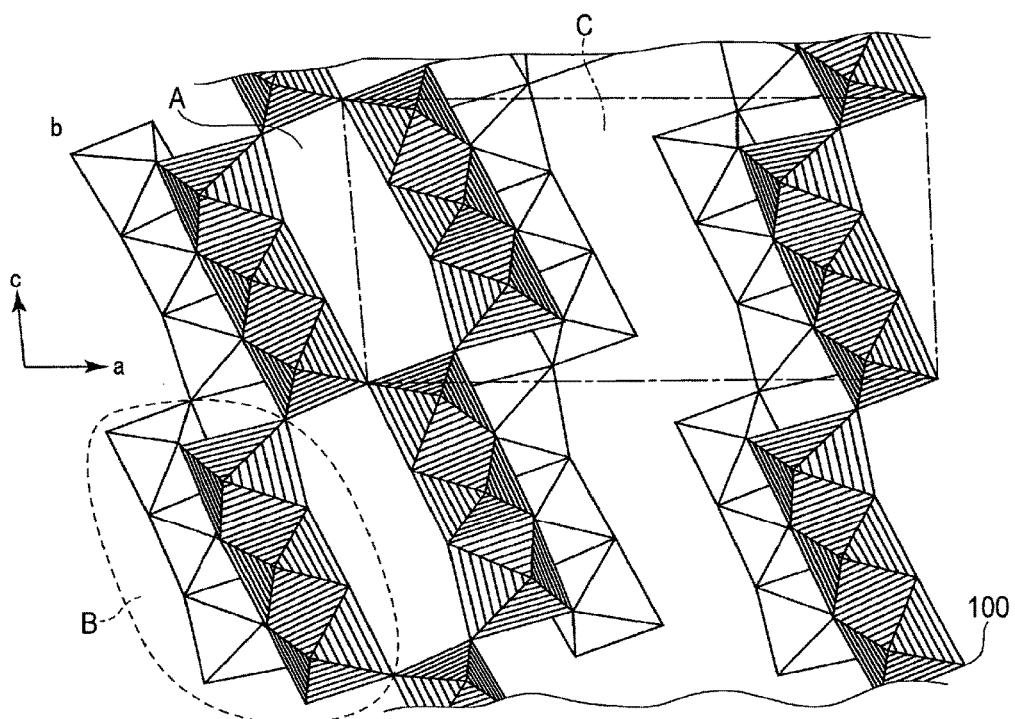
FIG. 2 is a schematic diagram showing a crystal structure of $Na_3Ti_9Nb_3O_{27}$.

FIG. 2 shows a crystal structure of $Na_3Ti_9Nb_3O_{27}$ as an example of a composite oxide having space group C2/m symmetry.

In the crystal structure shown in FIG. 2, vertex position 100 of a polyhedron indicates the position of oxide ion.

In the crystal structure shown in FIG. 2, a region A shows a vacancy site having a channel in which lithium ions can move three-dimensionally in the crystal structure, and the region A can have lithium ions be inserted and extracted. A region B has a polyhedral structure of an oxide centering on Ti or Nb serving as framework of the crystal structure. On the other hand, a region C is a layer-like vacancy site where lithium ions, which are capable of being inserted and extracted, exist. In the compound of this example, the lattice constants of the $\underline{a}$ axis, the b axis, and the c axis fall respectively within the range of 16.0 Å$\leq a \leq$21.0 Å, 3.5 Å$\leq b \leq$4.5 Å, and 8.0 Å$\leq c \leq$13.0 Å.

Such a composite oxide is preferable because sufficient space for inserting and extracting lithium ions can be obtained. In a battery active material including the composite oxide of this example, reversibility of lithium ions during charging and discharging is enhanced. Thus, the effective capacitance of the active material increases, the rate performance is high, and the life performance of a nonaqueous electrolyte battery can be improved, and therefore preferable.

The battery active material according to the first embodiment may include a composite oxide having a crystal structure in which, in addition to crystal phases having symmetries of space group C2, Cm, or C2/m, crystal phases having other symmetries are mixed. Alternatively, the battery active material according to the first embodiment may include a composite oxide having a crystal structure similar to symmetries of space group C2, Cm, or C2/m. In a battery active material including such a composite oxide, the same effect can be obtained as that of a battery active material of an aspect including a composite oxide having symmetries of space group C2, Cm, or C2/m. Specific examples of symmetry similar to the symmetry of C2/m include Cmca, F222, Pmcm, Pmma, and Cmma. One composite oxide having such a symmetry similar to the symmetry of C2/m may be included. Alternatively, two or more composite oxides each having such a symmetry, which may be the same or different from one another, may be included.

Subscript x in the general formula $Li_xM1_{4-y}Ti_{10-z}M2_{2+z}O_{27+\delta}$ may change within the range of $0 \leq x < 18$ according to the state of charge of the composite oxide. Subscript y represents an amount of the M1 element removed from the site of M1 in the crystal structure of a composite oxide represented by a general formula $Li_xM1_4Ti_{10}M2_2O_{27+\delta}$. y falls within the range of $0<y<4$. y preferably falls within the range of $1.0 \leq y \leq 3.0$ and more preferably falls within the range of $0.1 \leq y \leq 2.0$. Subscript z indicates an amount of titanium removed from the Ti site and an amount of the M2 element added to the M2 site. z falls within the range of $0<z<4$. z preferably falls within the range of $0.1 \leq z \leq 2.0$. $\delta$ falls within the range of $-0.3 \leq \delta \leq 0.3$. Subscript $\delta$ can vary in the range of $-0.3 \leq \delta \leq 0.3$ according to oxygen deficiency of the composite oxide represented by this general formula and an amount of oxygen unavoidably incorporated during a production process for a battery active material.

As an example, in the monoclinic crystal structure of the composite oxide represented by the general formula $Li_xNa_{4-y}Ti_{10-z}M2_{2+z}O_{27+\delta}$, in which the M1 element is Na, by reducing a portion of Na occupying the site of Na, a vacancy site that serves as a host for lithium ions can be composed at the site of Na. Thereby, while a lattice volume in which lithium ions can be easily inserted and extracted is maintained, the energy density per unit weight or unit volume can be increased. Moreover, the average operating potential of an electrode can be changed by changing the amount of Na. Thereby, designing of the potential of a battery becomes easy.

Furthermore, in a more preferable aspect among these aspects, the M2 element is Nb. That is, in this more preferable aspect, the composite oxide included in the battery active material according to the first embodiment is represented by a general formula $Li_xNa_{4-y}Ti_{10-z}Nb_{2+z}O_{27+\delta}$. While Ti can be reduced by a valence of one from tetravalent to trivalent, Nb can be reduced by a valence of two from pentavalent to trivalent. Thus, a lithium insertion amount into the composite oxide can be increased by substituting at least a portion of Ti with Nb. By substituting a portion of Ti with Nb while forming a vacancy site in the Na site, the lithium insertion amount into the composite oxide can be increased further. Moreover, in Nb, the oxidation-reduction potential upon Li insertion with respect to metallic lithium gently changes in a wide range of from 1.5 V to 1.0 V. Thus, when at least a portion of Ti is substituted with Nb, not only does the charge-and-discharge capacity increase, but also a flat portion of the potential becomes more mild as described above with reference to FIG. 1. Therefore, in a composite oxide in which a portion of Ti is substituted with Nb, correlation between a charge-and-discharge potential and state of charge can be easily comprehended, and thus, management of the state of charge of a battery becomes easy.

The composite oxide included in the battery active material according to the first embodiment may be in a particle form, for example. The average particle size of the composite oxide included in the battery active material of the first embodiment is not particularly limited, and can be changed according to desired battery performance.

The battery active material according to the first embodiment preferably includes the above composite oxide particles and a conductive substance such as carbon coating the surface thereof. The battery active material of such a preferable aspect can exhibit improved rapid charge-discharge performance. Since the insertion and extraction of lithium occur through a homogeneous solid-state reaction in the composite oxide, the composite oxide has a property where electrical conductivity increases in accordance with increasing amount of lithium inserted. In such a composite oxide, electrical conductivity becomes relatively low in a region with a low amount of inserted lithium. Therefore, by coating the surface of composite oxide particles in advance with a conductive substance such as carbon, a high rapid charge-and-discharge performance can be obtained, regardless of the inserted amount of lithium.

Alternatively, by coating the surface of the composite oxide particles with lithium titanate, which exhibit electrical conductivity in accordance with insertion of lithium, in place of the conductive substance such as carbon, the same effect can be obtained. In addition, when the battery is internally short-circuited, lithium is extracted from lithium titanate coating the surface of the composite oxide particles, and the lithium titanate becomes insulating. Therefore, excellent safety can be achieved.

<BET Specific Surface Area>

The BET specific surface area of the composite oxide included in the battery active material according to the first embodiment is not particularly limited, and is preferably 5 $m^2/g$ or more and less than 200 $m^2/g$. The BET specific surface area is more preferably 5 $m^2/g$ to 30 $m^2/g$.

When the BET specific surface area is 5 $m^2/g$ or more, the contact area with the electrolytic solution can be secured. Thus, good discharge rate performances can be easily obtained and also, a charge time can be shortened. On the other hand, when the BET specific surface area is less than 200 $m^2/g$, reactivity with the electrolytic solution can be prevented from being too high and therefore, the life performance can be improved. When the BET specific surface area is 30 $m^2/g$ or less, side reactions with the electrolytic solution can be suppressed, and thereby longer life can be further expected. Furthermore, in this case, a coatability of a slurry including the active material used in the production of an electrode, which will be described later, can be improved.

Here, as the measurement of the specific surface area, a method is used where molecules, in which an occupied area in adsorption is known, are adsorbed onto the surface of powder particles at the temperature of liquid nitrogen, and the specific surface area of the sample is determined from the amount of adsorbed molecules. The most frequently used method is a BET method based on the low temperature/low humidity physical adsorption of an inert gas. The basic theory of the BET method is the most well-known theory of the method of calculating the specific surface area in which the Langmuir theory, which is a monolayer adsorption theory, is extended to multilayer adsorption. The specific surface area determined by the above method is referred to as "BET specific surface area".

<Production Process>

It is preferable that the battery active material according to the first embodiment is synthesized as described below. Specifically, a starting compound is synthesized by a solid-phase reaction method, and this starting compound is subjected to proton exchange to form a precursor. Then, the precursor is subjected to heat treatment to perform dehydration, whereby the active material is synthesized.

First, a mixture is obtained by mixing oxides and salts of compounds as raw materials at a suitable stoichiometric ratio. At this time, a mixing ratio of the raw material is adjusted so that a composition ratio of the starting compound is $M1_{3-0.5y}Ti_{5-0.5z}M2_{1+0.5z}O_{14}$. The salts are preferably those that are decomposed at a relatively low temperature to produce an oxide, and examples thereof including carbonate and nitrate. Subsequently, the obtained mixture is pulverized and then mixed as uniformly as possible.

Next, the mixture obtained by pulverizing and mixing is preliminarily calcined. The preliminary calcining is performed in the air in a temperature range of 600 to 850° C. for a total one to three hours. Next, a calcining temperature is increased, and main calcining is performed in the air in a temperature range of 900 to 1500° C. The preliminarily calcined mixture is preferably mixed again before the main calcining. By thus performing in advance preliminary calcining to decompose carbonate and the like in the raw material and then remixing, particles of the raw material can be adhered to each other in the main calcining. As a result, uniform particles having high crystallinity can be obtained.

When calcining is performed at a temperature of 900° C. or more, lithium, which is a light element, may be evaporated. In this case, an amount of lithium that becomes evaporated under the calcining conditions is determined in advance, and an excess amount of a lithium raw material is included in a mixture of raw material by a corresponding amount, in order to compensate an evaporated amount to thereby obtain a sample of proper composition.

It is more preferable to prevent lattice defects due to oxygen deficiency or the like. For example, by press molding the raw material powder to process the powder into a pellet or rod form before main calcining, calcining can be performed while reducing an area in contact with the atmosphere and increasing a contact area between particles. Thereby, generation of lattice defects can be suppressed. In industrial mass production, it is preferable to repair oxygen deficiency. Here, when calcining the raw material powder, the oxygen deficiency can be repaired by performing the calcining under high oxygen partial pressure conditions, such as under an oxygen atmosphere. Alternatively, the oxygen deficiency may be repaired by performing heat treatment (annealing) in a temperature range of 400 to 1000° C. after calcining in an ordinary atmosphere. If generation of the lattice defects is not suppressed as thus, there is possibility that the crystallinity may become reduced.

Next, an alkali titanate compound (a starting compound) obtained by the above-described solid-phase reaction is dispersed into an acidic aqueous solution, such as that of hydrochloric acid, nitric acid or sulfuric acid, and then stirred. A treatment time with the acidic aqueous solution is adjusted to obtain a precursor $HM1_{2-0.5y}Ti_{5-0.5z}M2_{1-0.5z}O_{14} \cdot H_2O$ in which a portion of M1 in the starting compound is substituted by proton is obtained. This precursor is heated at from 900° C. to 1100° C. to completely dehydrate water of crystallization and, thus, to obtain target $Li_xM1_{4-y}Ti_{10-z}M2_{2+z}O_{27+\delta}$ (at this time, x=0). Here, in order to synthesize a composite oxide in which x>0, that is, a composite oxide in a state in which lithium is inserted in advance, the obtained $M1_{4-y}Ti_{10-z}M2_{2+z}O_{27+\delta}$ is immersed in an aqueous lithium hydroxide solution (1M), and ion exchange is performed, whereby $Li_xM1_{4-y}Ti_{10-z}M2_{2+z}O_{27+\delta}$ can be obtained.

In the above synthesis method, it is preferable that consecutively, the kinds of the M1 element or the M2 element are adjusted, or an amount that the M1 site is made into vacancy site or amount of substitution of M2 element are adjusted, such that the crystal structure of a composite oxide would have a symmetry according to any one of space groups C2, Cm, or C2/m, and the lattice constants of the a axis, the b axis, and the c axis would take on the range of 16.0 Å≤a≤21.0 Å, 3.5 Å≤b≤4.5 Å, and 8.0 Å≤c≤13.0 Å, respectively.

When the synthesis is performed as described above, for example, the composite oxide represented by the above general formula wherein the subscript x is 0 can be produced, as explained above. When the composite oxide wherein the subscript x is 0 is incorporated as the negative electrode active material into a nonaqueous electrolyte battery, and the resulting nonaqueous electrolyte battery is charged, a state in which the Li amount x in the formula is increased to the range of more than 0 and less than 18 is made. Alternatively, when a lithium source such as lithium carbonate is used as a raw material, and the composite oxide is synthesized in a raw material composition ratio so that the final value of x is within the range of more than 0 and less than 18, the composite oxide in a state in which the value of x is within the range of more than 0 and less than 18 can also be synthesized. In addition, the composite oxide in a state in which the value of x is within the range of more than 0 and less than 18 can also be obtained by, after the composite oxide is synthesized, immersing the composite oxide into the aqueous lithium hydroxide solution, as described above.

Next, a method for obtaining the X-ray diffraction diagram of the composite oxide according to the powder X-ray diffraction, and a method for examining the composition of the composite oxide will be described.

When a target active material to be measured is included in an electrode material of a nonaqueous electrolyte battery, a pre-treatment is performed as described below.

First, a state close to the state in which lithium ions are completely extracted from a crystal of the active material is achieved. When the target active material to be measured is included in a negative electrode, the battery is brought into a completely discharged state. The state in which the battery is completely discharged indicates a state in which an electrode including the active material is held for 1 hour or more at a potential of +3.0 V with respect to a metal lithium potential to extract mobile lithium ions within the active material.

Specifically, in order to achieve the state in which the battery is completely discharged, after the above battery is disassembled under a dry argon gas atmosphere, an electrode including the active material is taken out. Using this electrode, a three-pole half cell with metal lithium as counter electrode and reference electrode is constructed. In this case, the electrode operates as a positive electrode with respect to a metal lithium negative electrode. A current is flown in a charging direction (a direction where lithium is extracted from the electrode) by using a charging/discharging device until the cell potential in the half cell reaches 3.0 V. Once the cell potential has reached 3.0 V, by maintaining the potential at this value further for 1 hour or more to perform extraction of lithium ions from the electrode including the active material, whereby the completely discharged state can be achieved. Although a slight amount of remnant lithium ions may exist even in the discharged state, this does not significantly affect results of powder X-ray diffraction measurement described below.

Next, the battery (half cell) is disassembled in a glove box filled with argon, and the electrode is taken out. The taken-out electrode is washed with an appropriate solvent and dried under a reduced pressure. As the solvent, for example, ethyl methyl carbonate may be used. After washing and drying, whether or not there are white precipitates such as a lithium salt on the surface is examined.

When subjecting to the powder X-ray diffraction measurement, as described later, the washed electrode is cut into a size having the same area as that of a holder of the powder X-ray diffraction apparatus, and used as a measurement sample.

When subjecting to a composition analysis, the active material is taken out from the washed electrode, and the taken out active material is analyzed, as described later.

<Method for Obtaining X-Ray Diffraction Diagram of Composite Oxide According to Powder X-Ray Diffraction>

The powder X-ray diffraction measurement of the active material is performed as follows:

First, the target sample is ground until an average particle size reaches about 5 μm. Even if the original average particle size is less than 5 μm, it is preferable that the sample is subjected to a grinding treatment with a mortar in order to grind apart aggregates. The average particle size can be obtained by laser diffraction. The ground sample is filled in a holder part having a depth of 0.5 mm, formed on a glass sample plate. A glass sample plate manufactured by Rigaku Corporation is used as the glass sample plate, for example. At this time, care should be taken to fill the holder part sufficiently with the sample. Precaution should be taken to avoid cracking and formation of voids caused by insufficient filling of the sample. Then, another glass plate is used to smoothen the surface of the sample by sufficiently pressing the glass plate against the sample. In this case, precaution should be taken to avoid too much or too little a filling amount, so as to prevent any rises and dents in the basic plane of the glass holder. Next, the glass plate filled with the sample is set in a powder X-ray diffractometer. And then, a diffraction pattern [XRD (X-ray diffraction) pattern] is obtained using Cu—Kα rays.

In some cases, an orientation in which crystal planes are arranged in a specific direction may be observed from the results of the Rietveld analysis, depending on the shapes of particles. In such a case, there is the possibility of deviation of peak position and variation in an intensity ratio, depending on how the sample is filled. Such a sample having high orientation is desirably measured using a capillary (cylindrical glass narrow tube). Specifically, the sample is inserted into the capillary, which is then mounted on a rotary sample table and measured while being rotated. Such a measuring method can provide the result with the influence of orientation reduced.

As an apparatus for powder X-ray diffraction measurement, SmartLab manufactured by Rigaku is used, for example. Measurement is performed under the following condition: measurement method: parallel beam method (θ/2θ linked scan); Cu target; 45 kV, 200 mA; filter: Kβ filter or monochromator; soller slit: 5 degrees in both incident light and received light; step width: 0.02 deg; scan speed: 20 deg/min (5 deg/min when using monochromator); semiconductor detector: D/teX Ultra 250; sample plate holder: flat glass sample plate holder (0.5 mm in thickness); measurement range: $5°≤2θ≤90°$. When another apparatus is used, in order to obtain measurement results equivalent to those described above, measurement using a standard Si powder for powder X-ray diffraction is performed, and measurement is conducted under conditions where a peak intensity and a peak top position correspond to those obtained using the above apparatus. In addition, when effects of sample orientation is strong, and the peak intensity changes depending on the loading density into the glass plate holder, measurement should be made using a glass capillary and a rotary sample table.

The X-ray diffraction (xRD) pattern obtained herein is desirably one applicable to Rietveld analysis. In order to collect data for Rietveld analysis, the measurement time or X-ray intensity is appropriately adjusted in such a manner that the step width is made ⅓ to ⅕ of the minimum half width of the diffraction peaks, and the intensity at the peak position of strongest reflected intensity is 5,000 cps or more.

The XRD pattern obtained as described above is analyzed by the Rietveld method. In the Rietveld method, the diffraction pattern is calculated from the crystal structure model that has been estimated in advance. The parameters of the crystal structure (lattice constant, atomic coordinate, crystal site occupancy ratio, or the like) can be precisely analyzed by fitting all the calculated values with the measured values. Thereby, the characteristics of the crystal structure of the synthesized composite oxide can be determined. Furthermore, the site occupancy ratio of constitutional elements in each of the sites can be determined. A fitting parameter S is used as the scale for estimating the degree of agreement between the measured intensities and the calculated intensities in the Rietveld analysis. The S value must be less than 1.8 in the analysis. When determining the occupancies in each of the sites, the standard deviation $σ_j$ must be taken into consideration. The fitting parameter S and standard deviation $σ_j$ defined herein are estimated using the formula described in "Funmatsu X sen Kaisetsu no Jissai (Reality of Powder X-Ray Analysis)", X-Ray Analysis Investigation Conversazione, The Japan Society for Analytical Chemistry, written and edited by Izumi Nakai and Fujio Izumi (Asakura Publishing Co., Ltd.).

By the above method, information about the crystal structure of the target active material to be measured can be obtained. For example, when the battery active material according to the first embodiment is measured as described above, the measured target battery active material would be found to have a composite oxide having an orthorhombic structure. Further, the symmetry of the crystal structure of the measured target, such as space group C2/m, can be examined, for example, by measuring as described above.

When the target active material to be measured is included in the electrode material of a nonaqueous electrolyte battery, first, the electrode is taken out from the nonaqueous electrolyte battery according to the previously described procedure. The taken-out and washed electrode is cut to be of an area about equal to the area of the holder of a powder X-ray diffractometer, and used as the measurement sample.

The obtained measurement sample is affixed directly to the glass holder, and measured. In this case, the position of the peak originated from the electrode substrate such as a metal foil is measured in advance. The peaks of other components such as a conductive agent and a binder are also measured in advance. In such a case that the peaks of the substrate and active material overlap with each other, it is desirable that the layer including the active material (e.g., the later-described active material layer) is separated from the substrate, and subjected to measurement. This is in order to separate the overlapping peaks when quantitatively measuring the peak intensity. For example, the active material layer can be separated by irradiating the electrode substrate with an ultrasonic wave in a solvent. The active material layer is inserted into a capillary, mounted on a rotary sample table, and measured. By such a method, the XRD pattern of the active material can be obtained with the influence of the orientation reduced.

<Method for Examining Composition of Composite Oxide>

The composition of the battery active material can be analyzed using Inductively Coupled Plasma (ICP) emission spectrometry, for example. In this case, the abundance ratios of elements depend on the sensitivity of an analyzing device to be used. Therefore, when the composition of an example of the battery active material according to the first embodiment is analyzed, for example, using ICP emission spectrometry, the numerical values may deviate due to errors of the measuring device from the previously described element ratios. However, even if the measurement results deviate as described above in the error range of the analyzing device, the example of the battery active material according to the first embodiment can sufficiently exhibit the previously described effects.

In order to measure the composition of the battery active material assembled into a battery according to ICP emission spectrometry, the following procedure is specifically performed. First, according to the previously described procedure, an electrode including the target active material to be measured is taken out from a nonaqueous electrolyte battery, and washed. The washed electrode is put in a suitable solvent, and irradiated with an ultrasonic wave. For example, an electrode is put into ethyl methyl carbonate in a glass beaker and the glass beaker is vibrated in an ultrasonic washing machine, and thereby an electrode layer including the electrode active material can be separated from a current collector. Next, the separated electrode layer is dried under reduced pressure. The obtained electrode layer is ground in a mortar or the like to provide a powder including the target battery active material, conductive auxiliary agent, and binder or the like. By dissolving the powder in an acid, a liquid sample including the battery active material can be prepared. At this time, hydrochloric acid, nitric acid, sulfuric acid, and hydrogen fluoride or the like can be used as the acid. The composition of the battery active material can be found by subjecting the liquid sample to ICP emission spectrometric analysis.

According to the first embodiment, a battery active material including a composite oxide having a monoclinic crystal structure is provided. This composite oxide is represented by a formula $Li_xM1_{4-y}Ti_{10-z}M2_{2+z}O_{27+\delta}$. The composite oxide can indicate a mild potential change in the potential range of 1.0 V to 1.45 V (vs. Li/Li$^+$), and the average operating potential can be adjusted by changing the amount of Na. Moreover, the composite oxide has a crystal structure where lithium ions are easily inserted into and extracted from the crystal structure, and the charge-and-discharge capacity can be increased. As a result, the battery active material according to the first embodiment can realize a nonaqueous electrolyte battery that has a high energy density, can have a battery voltage designed easily, is excellent in rapid charge-and-discharge performances and life performance, and management of charging and discharging states thereof is easy.

Second Embodiment

According to a second embodiment, a nonaqueous electrolyte battery is provided. This nonaqueous electrolyte battery includes a negative electrode that includes the battery active material according to the first embodiment, a positive electrode, and a nonaqueous electrolyte.

The nonaqueous electrolyte battery according to the second embodiment can further include a separator provided between the positive electrode and the negative electrode. The positive electrode, the negative electrode, and the separator can compose an electrode group. The nonaqueous electrolyte may be held in the electrode group.

The nonaqueous electrolyte battery according to the second embodiment can further include a container member that houses the electrode group and the nonaqueous electrolyte.

The nonaqueous electrolyte battery according to the second embodiment can further include a positive electrode terminal electrically connected to the positive electrode and a negative electrode terminal electrically connected to the negative electrode. At least a part of the positive electrode terminal and at least a part of the negative electrode terminal may extend out to the exterior of the container member.

Hereinafter, the negative electrode, the positive electrode, the nonaqueous electrolyte, the separator, the container member, the positive electrode terminal, and the negative electrode terminal will be described in detail.

1) Negative Electrode

The negative electrode can include a current collector and a negative electrode layer (a negative electrode active material-including layer). The negative electrode layer can be formed on one surface or both of reverse surfaces of the current collector. The negative electrode layer can include a negative electrode active material, and optionally a conductive agent and a binder.

The negative electrode layer can include the battery active material according to the first embodiment as the negative electrode active material. A negative electrode using the battery active material according to the first embodiment has a low electrode potential that changes mildly in the range of 1.4 V (vs. Li/Li$^+$) to 1.0 V (vs. Li/Li$^+$), and the average operating potential can be adjusted. Moreover, the negative electrode has a crystal structure into and from which lithium ions are easily inserted and extracted, and thus, the charge-and-discharge capacity can be increased. Therefore, in the nonaqueous electrolyte battery according to the second embodiment including such a negative electrode, the charging and discharging states are easily managed, excellent life performance and a high energy density are achieved, the average operating voltage is easily adjusted, and a high battery voltage can be exhibited.

As the negative electrode, the battery active material according to the first embodiment may be singly used as the negative electrode active material; however, a mixture where the battery active material according to the first embodiment is further mixed with another active material may also be used. Examples of other active materials include lithium titanate having a ramsdellite structure (e.g., $Li_2Ti_3O_7$), lithium titanate having a spinel structure (e.g., $Li_4Ti_5O_{12}$), monoclinic titanium dioxide ($TiO_2$), anatase type titanium dioxide, rutile type titanium dioxide, a hollandite type titanium composite oxide, a monoclinic niobium titanium composite oxide (e.g., $Nb_2TiO_7$), lithium sodium titanate ($Na_2Li_2Ti_6O_{14}$), lithium strontium titanate ($Li_2SrTi_6O_{14}$), and the like. One of these other active materials may be used in combination with the active material according to the first embodiment. Alternatively, two or more of these other active materials may be used in combination with the active material according to the first embodiment.

The conductive agent is added to improve a current collection performance and to suppress the contact resistance between the negative electrode active material and the current collector. Examples of the conductive agent include carbonaceous substances such as vapor grown carbon fiber (VGCF), acetylene black, carbon black, and graphite. One of these may be included as the conductive agent, or two or more may be included in combination as the conductive agent.

The binder is added to fill gaps among the dispersed negative electrode active material and also to bind the negative electrode active material with the current collector. Examples of the binder include polytetrafluoroethylene (PTFE), polyvinylidene fluoride (PVdF), fluorine rubber, styrene-butadiene rubber, polyacrylic acid compounds, and imide compounds. One of these may be included as the binder, or two or more may be included in combination as the binder.

The active material, conductive agent and binder in the negative electrode layer are preferably blended in proportions of 68% by mass to 96% by mass, 2% by mass to 30% by mass, and 2% by mass to 30% by mass, respectively. When the amount of conductive agent is 2% by mass or more, the current collection performance of the negative electrode layer can be improved. When the amount of binder is 2% by mass or more, binding between the negative electrode layer and current collector becomes sufficient, and excellent cycling performances can be expected. On the other hand, an amount of each of the conductive agent and binder is preferably 28% by mass or less, in view of increasing the capacity.

As the current collector, a material which is electrochemically stable at the lithium insertion and extraction potential of the negative electrode active material is used. The current collector is preferably made of copper, nickel, stainless steel or aluminum, or an aluminum alloy including one or more elements selected from Mg, Ti, Zn, Mn, Fe, Cu, and Si. The thickness of the current collector is preferably 5 µm to 20 µm. The current collector having such a thickness can maintain balance between the strength and weight reduction of the negative electrode.

By using the battery active material according to the first embodiment, the density of the negative electrode layer (excluding the current collector) can be set in the range of 1.8 g/cm³ to 2.8 g/cm³. The negative electrode in which the density of the negative electrode layer is within this range can exhibit an excellent energy density, and at the same time, exhibit an excellent ability to hold the electrolytic solution. More preferably, the density of the negative electrode layer is 2.1 g/cm³ to 2.6 g/cm³.

The negative electrode is produced by, for example, suspending a negative electrode active material, a binder, and a conductive agent in a solvent used ordinarily to prepare a slurry, applying the slurry to a current collector, drying the coating to form a negative electrode layer, and then pressing the layer. The negative electrode may also be produced by forming a negative electrode active material, a binder, and a conductive agent into pellets as the negative electrode layer, and disposing the pellets onto a current collector.

2) Positive Electrode

The positive electrode can include a current collector and a positive electrode layer (positive electrode active material-including layer). The positive electrode layer may be formed on one surface or both of reverse surfaces of the current collector. The positive electrode layer can include a positive electrode active material, and optionally a conductive agent and a binder.

As the positive electrode active material, for example, an oxide or a sulfide may be used. Examples of the oxide and sulfide include a compound capable of having lithium inserted and extracted. Specific examples thereof include manganese dioxide ($MnO_2$), iron oxide, copper oxide, nickel oxide, lithium manganese composite oxide (e.g., $Li_xMn_2O_4$ or $Li_xMnO_2$), lithium nickel composite oxide (e.g., $Li_xNiO_2$), lithium cobalt composite oxide (e.g., $Li_xCoO_2$), lithium nickel cobalt composite oxide (e.g., $LiNi_{1-y}Co_yO_2$), lithium manganese cobalt composite oxide (e.g., $Li_xMn_yCo_{1-y}O_2$), lithium manganese nickel composite oxide having a spinel structure (e.g., $Li_xMn_{2-y}Ni_yO_4$), lithium phosphorus oxide having an olivine structure (e.g., $Li_xFePO_4$, $Li_xFe_{1-y}Mn_yPO_4$, and $Li_xCoPO_4$), iron sulfate $[Fe_2(SO_4)_3]$, vanadium oxide (e.g., $V_2O_5$), and lithium nickel cobalt manganese composite oxide. In the above-described formulas, $0<x\leq1$, and $0<y\leq1$. As the active material, one of these compounds may be used singly, or plural compounds may be used in combination.

More preferred examples of the positive electrode active material include lithium manganese composite oxide (e.g., $Li_xMn_2O_4$), lithium nickel composite oxide (e.g., $Li_xNiO_2$), lithium cobalt composite oxide (e.g., $Li_xCoO_2$), lithium nickel cobalt composite oxide (e.g., $LiNi_{1-y}Co_yO_2$), lithium manganese nickel composite oxide having a spinel structure (e.g., $Li_xMn_{2-y}Ni_yO_4$), lithium manganese cobalt composite oxide (e.g., $Li_xMn_yCo_{1-y}O_2$), lithium iron phosphate (e.g., $Li_xFePO_4$), and lithium nickel cobalt manganese composite oxide, which have a high positive electrode voltage. In the above-described formulas, $0<x\leq1$, and $0<y\leq1$.

When an ordinary temperature molten salt is used as the nonaqueous electrolyte of the battery, preferred examples of the positive electrode active material include lithium iron phosphate, $Li_xVPO_4F$ ($0\leq x\leq1$), lithium manganese composite oxide, lithium nickel composite oxide, and lithium nickel cobalt composite oxide. Since these compounds have low reactivity with ordinary temperature molten salts, cycle life can be improved.

The primary particle size of the positive electrode active material is preferably 100 nm to 1 µm. The positive electrode active material having a primary particle size of 100 nm or more is easy to handle during industrial production. In the positive electrode active material having a primary particle size of 1 µm or less, diffusion of lithium ions within solid can proceed smoothly.

The specific surface area of the positive electrode active material is preferably 0.1 m²/g to 10 m²/g. The positive electrode active material having a specific surface area of 0.1 m²/g or more can secure sufficient sites for inserting and extracting lithium ions. The positive electrode active material having a specific surface area of 10 m²/g or less is easy to handle during industrial production, and can secure a good charge and discharge cycle performance.

The binder is added to bind the positive electrode active material with the current collector. Examples of the binder include polytetrafluoroethylene (PTFE), polyvinylidene fluoride (PVdF), fluorine rubber, polyacrylic acid compounds, and imide compounds. One of these may be included as the binder, or two or more may be included in combination as the binder.

The conductive agent is added as necessary, in order to improve the current collection performance, and at the same time, suppress the contact resistance between the positive electrode active material and current collector. Examples of the conductive agent include carbonaceous substances such as acetylene black, carbon black and graphite. One of these may be included as the conductive agent, or two or more may be included in combination as the conductive agent.

In the positive electrode layer, the positive electrode active material and binder are preferably included in proportions of 80% by mass to 98% by mass, and 2% by mass to 20% by mass, respectively.

When the amount of the binder is 2% by mass or more, sufficient electrode strength can be achieved. When the amount of the binder is 20% by mass or less, the amount of the insulator in the electrode can be reduced, and thereby the internal resistance can be decreased.

When a conductive agent is added, the positive electrode active material, binder, and conductive agent are preferably included in proportions of 77% by mass to 95% by mass, 2% by mass to 20% by mass, and 3% by mass to 15% by mass, respectively. When the amount of the conductive agent is 3% by mass or more, the above-described effects can be expressed. By setting the amount of the positive electrode conductive agent to 15% by mass or less, the decomposition of a nonaqueous electrolyte on the surface of the positive electrode conductive agent during high-temperature storage can be reduced.

The current collector is preferably an aluminum foil, or an aluminum alloy foil including one or more elements selected from Mg, Ti, Zn, Ni, Cr, Mn, Fe, Cu, and Si.

The thickness of the aluminum foil or aluminum alloy foil is preferably 5 µm to 20 µm, and more preferably 15 µm or less. The purity of the aluminum foil is preferably 99% by mass or more. The amount of the transition metal such as iron, copper, nickel, or chromium included in the aluminum foil or aluminum alloy foil is preferably 1% by mass or less.

The positive electrode is produced by, for example, suspending a positive electrode active material, a binder, and a conductive agent, which is added as necessary, in an appropriate solvent to prepare a slurry, applying the slurry to a positive electrode current collector, drying the coating to form a positive electrode layer, and then pressing the layer. The positive electrode may also be produced by forming an active material, a binder, and a conductive agent, which is added as necessary, into pellets as the positive electrode layer, and disposing the pellets onto a current collector.

3) Nonaqueous Electrolyte

The nonaqueous electrolyte may be, for example, a liquid nonaqueous electrolyte which is prepared by dissolving an electrolyte in an organic solvent, or gel like nonaqueous electrolyte which is a composite of a liquid electrolyte and a polymer material.

The liquid nonaqueous electrolyte is preferably prepared by dissolving an electrolyte in an organic solvent at a concentration of 0.5 mol/L to 2.5 mol/L.

Examples of the electrolyte include lithium salts such as lithium perchlorate ($LiClO_4$), lithium hexafluorophosphate ($LiPF_6$), lithium tetrafluoroborate ($LiBF_4$), lithium hexafluoroarsenate (LiAsF6), lithium trifluoromethanesulfonate ($LiCF_3SO_3$), and lithium bistrifluoromethylsulfonylimide [$LiN(CF_3SO_2)_2$], and mixtures thereof. The electrolyte is preferably resistant to oxidation even at a high potential, and most preferably $LiPF_6$.

Examples of the organic solvent include a cyclic carbonate such as propylene carbonate (PC), ethylene carbonate (EC), or vinylene carbonate (VC); a linear carbonate such as diethyl carbonate (DEC), dimethyl carbonate (DMC), or methyl ethyl carbonate (MEC); a cyclic ether such as tetrahydrofuran (THF), 2-methyl tetrahydrofuran (2-MeTHF), or dioxolane (DOX); a linear ether such as dimethoxy ethane (DME) or diethoxy ethane (DEE); γ-butyrolactone (GBL), acetonitrile (AN), and sulfolane (SL). These organic solvents may be used singularly or as a mixed solvent.

Examples of the polymeric material include polyvinylidene fluoride (PVdF), polyacrylonitrile (PAN), and polyethylene oxide (PEO).

Alternatively, the nonaqueous electrolyte may be, for example, an ordinary temperature molten salt (ionic melt) including lithium ions, a polymer solid electrolyte, or an inorganic solid electrolyte.

The ordinary temperature molten salt (ionic melt) means compounds among organic salts made of combinations of organic cations and anions, which are able to exist in a liquid state at ordinary temperature (15 to 25° C.). The ordinary temperature molten salt includes an ordinary temperature molten salt which exists alone as a liquid, an ordinary temperature molten salt which becomes a liquid upon mixing with an electrolyte, and an ordinary temperature molten salt which becomes a liquid when dissolved in an organic solvent. In general, the melting point of the ordinary temperature molten salt used in nonaqueous electrolyte batteries is 25° C. or below. The organic cations generally have a quaternary ammonium framework.

The polymer solid electrolyte is prepared by dissolving the electrolyte in a polymeric material, and solidifying it.

The inorganic solid electrolyte is a solid substance having lithium ion conductivity.

4) Separator

The separator may be made of, for example, a porous film or synthetic resin nonwoven fabric including polyethylene, polypropylene, cellulose, or polyvinylidene fluoride (PVdF). Among these, a porous film formed from polyethylene or polypropylene melts at a fixed temperature and thus able to shut off a current, therefore the porous film can improve safety.

5) Container Member

As the container member, for example, a laminate film having a thickness of 0.5 mm or less, or a metal case having a wall thickness of 1 mm or less may be used. The thickness of the laminate film is more preferably 0.2 mm or less. The wall thickness of the metal case is more preferably 0.5 mm or less, and still more preferably 0.2 mm or less.

The shape of the container member is not particularly limited, and may be, for example, flat (thin), square, cylinder, coin, or button-shaped. The container member depends on the size of the battery, and may be that for a compact battery mounted on mobile electronic devices, or a large battery mounted on vehicles such as two- to four-wheel automobiles.

As the laminate film, used is a multilayer film including resin layers and a metal layer sandwiched between the resin layers. The metal layer is preferably an aluminum foil or an aluminum alloy foil, so as to reduce weight. The resin layer may be, for example, a polymeric material such as polypropylene (PP), polyethylene (PE), nylon, or polyethylene terephthalate (PET). The laminate film may be heat-sealed to be formed into the shape of a container member.

The metal case is made of aluminum or an aluminum alloy, for example. As the aluminum alloy, an alloy including one or more of an element such as magnesium, zinc, or silicon is preferable. If a transition metal such as iron, copper, nickel, or chromium is included in the alloy, the included amount thereof is preferably set to 1% by mass or less.

6) Positive Electrode Terminal and Negative Electrode Terminal

The positive electrode terminal may be made of, for example, a material that has electrical stability in the potential range of 3 V to 5 V (vs. $Li/Li^+$) relative to the oxidation-and-reduction potential of lithium, and electrical conductivity. Specifically, the positive electrode terminal is made of aluminum or an aluminum alloy including one or more of Mg, Ti, Zn, Mn, Fe, Cu, and Si or the like. The positive electrode terminal is preferably made of the same material as the positive electrode current collector in order to reduce contact resistance with the positive electrode current collector.

The negative electrode terminal may be made of a material that is electrochemically stable at the potential at which Li is inserted into and extracted from the above-described negative electrode active material, and has electrical conductivity. Specific examples of the material for the negative electrode terminal include copper, nickel, stainless steel, or aluminum. The negative electrode terminal is preferably made of the same material as the negative electrode current collector in order to reduce the contact resistance with the negative electrode current collector.

Next, the nonaqueous electrolyte battery according to the second embodiment will be more specifically described with reference to the drawings.

First, an example of the nonaqueous electrolyte battery according to the second embodiment will be described with reference to FIGS. 3 and 4.

Figure 3:
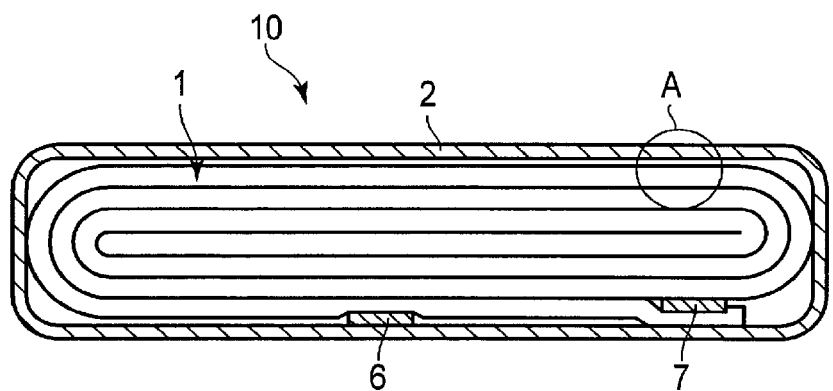
FIG. 3 is a cross-sectional view of a flat type nonaqueous electrolyte battery according to a second embodiment.

FIG. 3 is a cross-sectional view of an example of a nonaqueous electrolyte battery according to the second embodiment. FIG. 4 is an enlarged cross-sectional view showing a portion A in FIG. 3.

Figure 4:
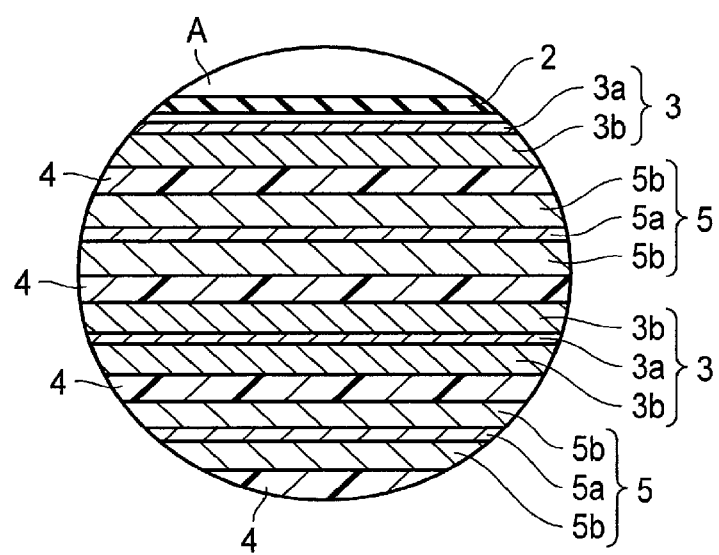
FIG. 4 is an enlarged cross-sectional view of an A portion of FIG. 3.

A nonaqueous electrolyte battery 10 shown in FIGS. 3 and 4 includes a bag-shaped container member 2 shown in FIG. 3, an electrode group 1 shown in FIGS. 3 and 4, and a nonaqueous electrolyte (not shown). The electrode group 1 and the nonaqueous electrolyte are housed in the container member 2. The nonaqueous electrolyte is held in the electrode group 1.

The bag shaped container member 2 is made of a laminate film including two resin layers and a metal layer sandwiched between the resin layers.

As shown in FIG. 3, the electrode group 1 is a wound electrode group in a flat form. The wound electrode group 1 in a flat form is formed by, spirally winding a stack where stacked, in order from the outside, are a negative electrode 3, a separator 4, a positive electrode 5, and a separator 4, as shown in FIG. 4, and then press-forming the wound laminate.

The negative electrode 3 includes a negative electrode current collector 3a and a negative electrode layer 3b. In the negative electrode layer 3b, the battery active material according to the first embodiment is included. The negative electrode 3 on the outermost layer has a configuration in which a negative electrode layer 3b is formed only on one side which is the internal surface of a negative electrode current collector 3a as shown in FIG. 4. For the other negative electrode 3, the negative electrode layers 3b are formed on both of reverse surfaces of the negative electrode current collector 3a.

The positive electrode 5 includes a positive electrode current collector 5a and positive electrode layers 5b formed on both of reverse surfaces of the positive electrode current collector 5a.

As shown in FIG. 3, in the vicinity of the outer peripheral edge of the wound electrode group 1, a negative electrode terminal 6 is connected to the negative electrode current collector 3a in the outermost negative electrode 3, and a positive electrode terminal 7 is connected to the positive electrode current collector 5a in the positive electrode 5 on the inner side. The negative electrode terminal 6 and the positive electrode terminal 7 are extended out from the opening of the bag shaped container member 2.

The nonaqueous electrolyte battery 10 shown in FIGS. 3 and 4 can be produced according to the following procedure, for example. First, an electrode group 1 is produced. The electrode group 1 is then enclosed in a bag-shaped container member 2. Upon which, one ends of each the negative electrode terminal 6 and positive electrode terminal 7 are made to protrude outside the container member 2. Next, the circumference of the container member 2 is heat-sealed with a portion left unsealed. Next, from a portion that had not been heat-sealed, for example, a liquid nonaqueous electrolyte is poured in via the opening of the bag shaped container member 2. Finally, the opening is heat-sealed, and thereby the wound electrode group 1 and the liquid nonaqueous electrolyte are completely sealed.

Figure 5:
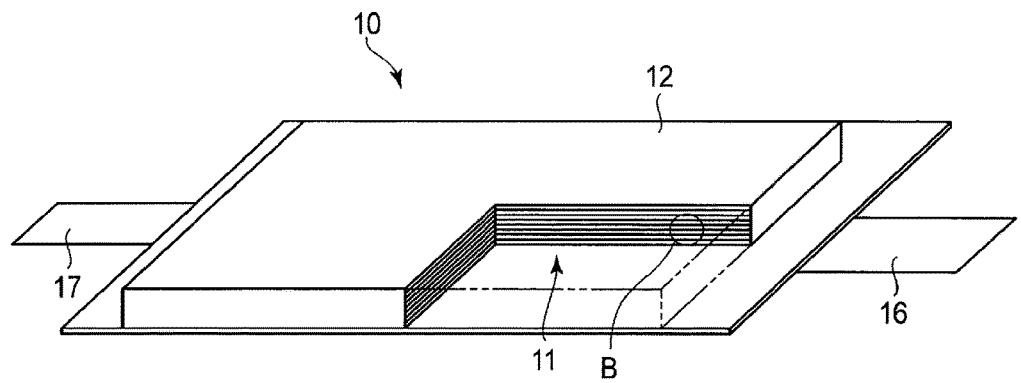
FIG. 5 is a partially cut-out perspective view schematically showing another flat type nonaqueous electrolyte battery according to the second embodiment.
Figure 6:
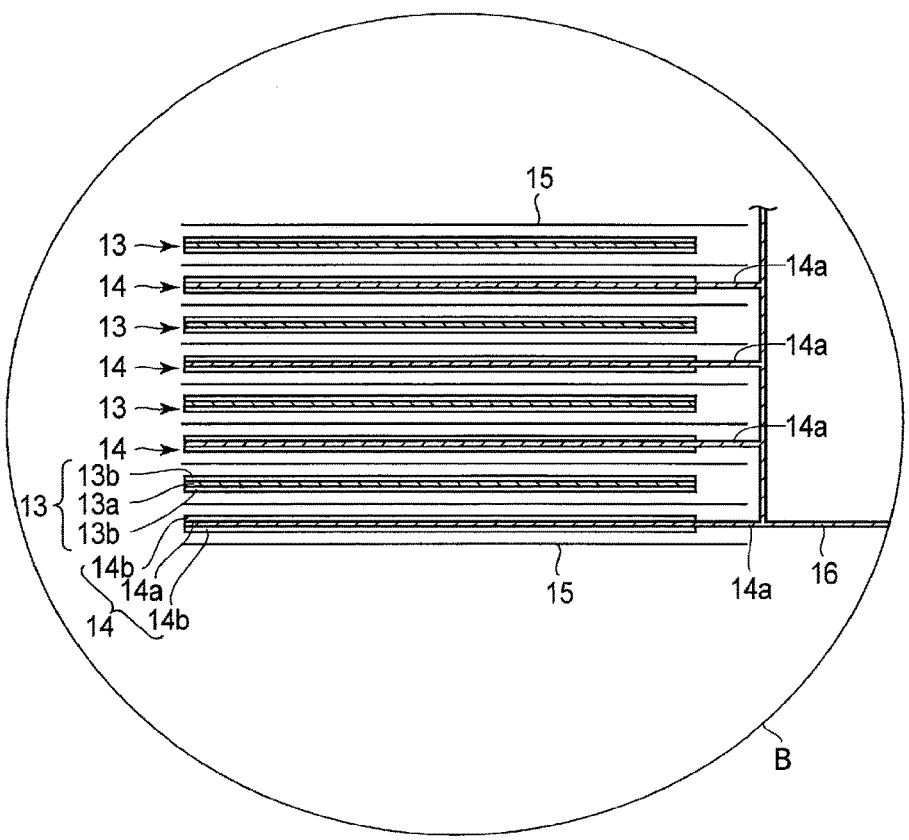
FIG. 6 is an enlarged cross-sectional view of a B portion of FIG. 5.

The nonaqueous electrolyte battery according to the second embodiment is not limited to the example nonaqueous electrolyte secondary battery shown above in FIGS. 3 and 4, and may be, for example, a battery configured as shown in FIGS. 5 and 6.

FIG. 5 is a partially cut-out perspective view schematically showing another example of a nonaqueous electrolyte battery according to the second embodiment. FIG. 6 is an enlarged cross-sectional view showing a portion B in FIG. 5.

A nonaqueous electrolyte battery 10 shown in FIGS. 5 and 6 includes an electrode group 11 shown in FIGS. 5 and 6, a container member 12 shown in FIG. 5, and a nonaqueous electrolyte (not shown). The electrode group 11 and the nonaqueous electrolyte are housed in the container member 12. The nonaqueous electrolyte is held in the electrode group 11.

The container member 12 is made of a laminate film including two resin layers and a metal layer sandwiched between the resin layers.

As shown in FIG. 6, the electrode group 11 is a stacked electrode group. As shown in FIG. 6, the stacked electrode group 11 has a structure in which positive electrodes 13 and negative electrodes 14 are alternately stacked with a separator 15 sandwiched therebetween.

The electrode group 11 includes plural positive electrodes 13. Each of the plural positive electrodes 13 includes a positive electrode current collector 13a, and positive electrode layers 13b supported on both of reverse surfaces of the positive electrode current collector 13a. The electrode group 11 includes plural negative electrodes 14. Each of the plural negative electrodes 14 includes a negative electrode current collector 14a, and negative electrode layers 14b supported on both of reverse surfaces of the negative electrode current collector 14a. An end of the negative electrode current collector 14a of each of the negative electrodes 14 protrudes out from the negative electrode 14. The protruded negative electrode current collector 14a is electrically connected to a strip-shaped negative electrode terminal 16. The tip of the strip-shaped negative electrode terminal 16 is extended out from the container member 12. Although not shown in the drawings, an end of the positive electrode current collector 13a of the positive electrodes 13 protrude from the positive electrodes 13 at the side opposed to the protruded end of the negative electrode current collector 14a. The positive electrode current collector 13a protruding from the positive electrode 13 is electrically connected to a strip-shaped positive electrode terminal 17. The tip of the strip-shaped positive electrode terminal 17 is positioned on the opposite side from the negative electrode terminal 16, and extended out from a side of the container member 12.

The nonaqueous electrolyte battery according to the second embodiment includes the active material according to the first embodiment. Thus, the nonaqueous electrolyte battery according to the second embodiment can exhibit a high energy density, excellent rapid charge-and-discharge performances and long life performance, and voltage management can be performed easily.

Third Embodiment

According to a third embodiment, a battery pack is provided. The battery pack includes the nonaqueous electrolyte battery according to the second embodiment.

The battery pack according to the third embodiment may include one or more nonaqueous electrolyte batteries (unit cells) according to the second embodiment described above. When plural unit cells are included, each of the unit cells are arranged so as to be electrically connected in series or in parallel. The plural unit cells may also be connected in a combination of in a series and in parallel. The plural nonaqueous electrolyte batteries, which may be included in the battery pack according to the third embodiment, may be electrically connected in series or in parallel, to structure a battery module. The battery pack according to the third embodiment may include plural battery modules.

The battery pack according to the third embodiment may further include a protective circuit. The protective circuit has a function to control charging and discharging of the nonaqueous electrolyte battery. Alternatively, a circuit included in an equipment where the battery pack serves as a power source (for example, electronic devices, vehicles, and the like) may be used as the protective circuit for the battery pack.

Moreover, the battery pack according to the third embodiment may further comprise an external power distribution terminal. The external power distribution terminal is configured to externally output current from the nonaqueous electrolyte battery, and to input current to the nonaqueous electrolyte battery. In other words, when the battery pack is used as a power source, the current is externally provided via the external power distribution terminal. When the battery pack is charged, the charging current (including regenerative energy caused by power of vehicles such as automobiles) is provided to the battery pack via the external power distribution terminal.

Next, an example of a battery pack according to the third embodiment will be described with reference to the drawings.

FIG. 7 is an exploded perspective view of an example of the battery pack according to the third embodiment. FIG. 8 is a block diagram showing an electric circuit of the battery pack of FIG. 7.

A battery pack 20 shown in FIGS. 7 and 8 includes plural unit cells 21. The plural unit cells 21 are flat nonaqueous electrolyte batteries 10 described with reference to FIGS. 3 and 4.

Plural unit cells 21 are stacked so that the negative electrode terminals 6 and the positive electrode terminals 7 extended outside are arranged in the same direction, and fastened with an adhesive tape 22 to configure a battery module 23. The unit cells 21 are electrically connected to each other in series as shown in FIG. 8.

A printed wiring board 24 is arranged to face opposite to the side plane of the battery module 23 where the negative electrode terminal 6 and the positive electrode terminal 7 extend out from. A thermistor 25, a protective circuit 26, and an energizing terminal 27 to an external device, which serves as an external power distribution terminal, are mounted on the printed wiring board 24 as shown in FIG. 8. An electric insulating plate (not shown) is attached to the surface of the printed wiring board 24 facing the battery module 23 to avoid unnecessary connection of the wires of the battery module 23.

A positive electrode-side lead 28 is connected to the positive electrode terminal 7 located at the bottom layer of the battery module 23 and the distal end of the lead 28 is inserted into a positive electrode-side connector 29 of the printed wiring board 24 so as to be electrically connected. A negative electrode-side lead 30 is connected to the negative electrode terminal 6 located at the top layer of the battery module 23 and the distal end of the lead 30 is inserted into an negative electrode-side connector 31 of the printed wiring board 24 so as to be electrically connected. The connectors 29 and 31 are connected to the protective circuit 26 through wires 32 and 33 formed on the printed wiring board 24.

The thermistor 25 detects the temperature of the unit cells 21, and the detection signal is sent to the protective circuit 26. The protective circuit 26 can shut down a plus-side wire 34a and a minus-side wire 34b between the protective circuit 26 and the energizing terminal 27 to an external device, which serves as an external power distribution terminal, under a predetermined condition. The predetermined condition indicates, for example, the case where the temperature detected by the thermistor 25 becomes a predetermined temperature or more. Another example of the predetermined condition is when over-charge, over-discharge, or over-current of the unit cells 21 is detected. The detection of the over-charge and the like is performed on each of the unit cells 21 or the entire battery module 23. When each of the unit cells 21 is detected, the cell voltage may be detected, or positive electrode or negative electrode potential may be detected. In the latter case, a lithium electrode to be used as a reference electrode is inserted into each of the unit cells 21. In the case of the battery pack 20 of FIGS. 7 and 8, wires 35 for voltage detection are connected to each of the unit cells 21. Detection signals are sent to the protective circuit 26 through the wires 35.

Protective sheets 36 made of rubber or resin are arranged on three side planes of the battery module 23 except the side plane from which the positive electrode terminal 7 and the negative electrode terminal 6 protrude out from.

The battery module 23 is housed in a housing container 37 together with each of the protective sheets 36 and the printed wiring board 24. That is, the protective sheets 36 are arranged on both internal surfaces in a long side direction and on one internal surface in a short side direction of the housing container 37. The printed wiring board 24 is arranged on the internal surface on the opposite side in a short side direction. The battery module 23 is located in a space surrounded by the protective sheets 36 and the printed wiring board 24. A lid 38 is attached to the upper surface of the housing container 37.

In order to fix the battery module 23, a heat-shrinkable tape may be used in place of the adhesive tape 22. In this case, the battery module is bound by placing the protective sheets on the both sides of the battery module, revolving the heat-shrinkable tape, and thermally shrinking the heat-shrinkable tape.

In FIGS. 7 and 8, an embodiment has been shown where plural unit cells 21 are connected in series; however, the connection may be made in parallel in order to increase battery capacity. Alternatively, connection in series may be combined with connection in parallel. Assembled battery packs may be connected further in series or in parallel.

Furthermore, although the battery pack shown in FIGS. 7 and 8 include plural unit cells 21, the battery pack according to the third embodiment may include only one unit cell 21.

The aspect of the battery pack according to the third embodiment may be appropriately changed depending on its application. The battery pack according to the third embodiment can be suitably used in applications in which cycle performance is demanded to be excellent when large current is taken out. Specifically the battery pack is used as a power source of a digital camera, or for example, a battery for mounting on a vehicle such as a two- or four-wheeled hybrid electric automobile, a two- or four-wheeled electric automobile or a power-assisted bicycle. In particular, the battery pack is suitably used for a battery mounted on a vehicle.

In a vehicle to which the battery pack according to the third embodiment has been mounted, the battery pack is configured, for example, to recover regenerative energy caused by power of the vehicle. Examples of the vehicle include two to four-wheeled hybrid electric automobiles, two to four-wheeled electric automobiles, electric assist bicycles, and electric trains.

Figure 9:
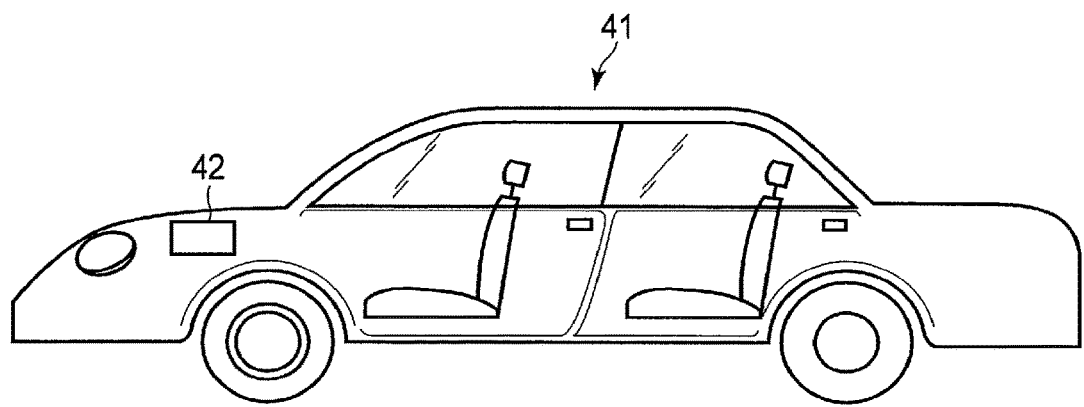
FIG. 9 is a schematic view showing a vehicle including the battery pack according to the third embodiment.

FIG. 9 shows an example of an automobile that includes a battery pack according to the third embodiment.

The automobile 41 shown in FIG. 9 includes a battery pack 42, which is an example of the battery pack according to the third embodiment, mounted in its engine room. The mounting position is not limited to engine rooms. For example, the battery pack may also be mounted in rear parts of automobiles or under seats.

The battery pack according to the third embodiment includes the nonaqueous electrolyte battery according to the second embodiment. Thus, the battery pack according to the third embodiment can exhibit a high energy density, excellent rapid charge-and-discharge performances and long life performance, and voltage management can be performed easily.

EXAMPLES

Hereinafter, the above embodiments will be described in more detail based on examples. For the synthesized monoclinic composite oxides, identification of a crystal phase and estimation of a crystal structure were conducted by a powder X-ray diffraction method using Cu—Kα radiation. Composition of the products was analyzed by the ICP method to confirm that a target material was obtained.

Synthesis

Examples 1 to 12

In Examples 1 to 12, products of Examples 1 to 12 were synthesized following the procedure of the production process of the first embodiment.

Specifically, the products were synthesized as follows. First, a starting compound was synthesized by a solid-phase reaction method. Next, a portion of alkali metal included in the starting compound was subjected to proton exchange in acid solution to obtain a precursor. The obtained precursor was subjected to dehydration heat treatment to synthesize a compound having a final target composition. The final target composition in each of Examples 1 to 12 and a target composition of the starting compound are shown below in Table 1.

First, a starting compound described in Table 1 was synthesized by solid-phase reaction. As starting materials, commercially available oxide and carbonate reagents shown in Table 1 (M1 source, Ti source, M2 source) were provided such that a molar ratio similarly shown in Table 1 was satisfied, while a total weight was 50 g, at the same time. Next, the starting materials provided as above were mixed, and the obtained mixture was put into an agate pod for ball milling (capacity: 300 ml). Agate balls having respective diameters of 10 mm and 5 mm were placed in the pod at a number ratio of 1:1, such that a capacity of the balls was one-third of the capacity of the pod. After that, 50 ml of ethanol was put into the pod, and wet mixing was performed at 120 rpm for 60 minutes to obtain a mixture. Since the raw materials are uniformly mixed by such wet mixing, a single phase of a target crystal phase can be obtained.

Next, the thus obtained mixture was placed into an electric furnace and subjected to heat treatment by the following procedure.

First, preliminary calcining was performed in an air atmosphere at a temperature of 650° C. for 6 hours. Subsequently, a powder obtained by preliminary calcining was taken out from the furnace, pulverized again, and then further mixed.

To the thus obtained mixture, subsequently, first calcining was performed at a temperature of 950° C. for 6 hours. After calcining, the calcined powder was taken out from the furnace and then mixed again.

Subsequently, the calcined powder, which had been mixed again, was placed into the furnace, and second calcining was performed in the air atmosphere at a temperature of 950° C. for 6 hours. A powder obtained after the second calcining, that is, the powder obtained by calcining at a temperature of 950° C. for 12 hours in total was pulverized to form starting compounds of Examples 1 to 12.

Next, the obtained starting compound powder was put into a 1 M aqueous hydrochloric acid solution such that the amount put in was 1 g per 1 L of the solution. In this manner, by performing proton exchange while collecting samples every 1 hour to analyze the composition of the product by the ICP method, a precursor having a target composition $HM1_{2-0.5y}Ti_{5-0.5z}M2_{1+0.5z}O_{14} \cdot H_2O$ was obtained.

The obtained precursor was heated at between 900° C. and 1100° C. to completely dehydrate the water of crystallization, and thus, products having a final target composition of Examples 1 to 10 and 12 were obtained.

Meanwhile, in synthesizing the product of Example 11, a product obtained in a similar manner as Example 1 was put into a 1 M aqueous lithium hydroxide solution such that the amount put in was 1 g per 1 L of the solution, and then stirred at 60° C. for 1 hour, and lithium ions were chemically inserted, whereby the product having a final target composition of Example 11 was obtained.

TABLE 1

| | Final Target Composition | Starting Compound Composition | Li source/ amount | M1 source/ amount | Ti source/ amount | M2 source/ amount |
|---|---|---|---|---|---|---|
| Comparative Example 1 | $Li_2Na_2Ti_6O_{14}$ | none | $Li_2CO_3/1.0$ | $Na_2CO_3/1.0$ | $TiO_2/6.0$ | — |
| Comparative Example 2 | $Na_2Ti_6O_{13}$ | none | — | $Na_2CO_3/1.0$ | $TiO_2/6.0$ | — |
| Example 1 | $Na_{3.9}Ti_{9.9}Nb_{2.1}O_{27}$ | $Na_{2.95}Ti_{4.95}Nb_{1.05}O_{14}$ | — | $Na_2CO_3/1.475$ | $TiO_2/4.95$ | $Nb_2O_5/0.525$ |
| Example 2 | $Na_{3.5}Ti_{9.5}Nb_{2.5}O_{27}$ | $Na_{2.75}Ti_{4.75}Nb_{1.25}O_{14}$ | — | $Na_2CO_3/1.375$ | $TiO_2/4.75$ | $Nb_2O_5/0.625$ |
| Example 3 | $Na_3Ti_9Nb_3O_{27}$ | $Na_{2.5}Ti_{4.5}Nb_{1.5}O_{14}$ | — | $Na_2CO_3/1.25$ | $TiO_2/4.5$ | $Nb_2O_5/0.75$ |
| Example 4 | $Na_2Ti_8Nb_4O_{27}$ | $Na_2Ti_4Nb_2O_{14}$ | — | $Na_2CO_3/1.0$ | $TiO_2/4.0$ | $Nb_2O_5/1.0$ |
| Example 5 | $NaTi_7Nb_5O_{27}$ | $Na_{1.5}Ti_{3.5}Nb_{2.5}O_{14}$ | — | $Na_2CO_3/0.75$ | $TiO_2/3.5$ | $Nb_2O_5/1.25$ |
| Example 6 | $Na_{0.5}Ti_{6.5}Nb_{5.5}O_{27}$ | $Na_{1.25}Ti_{3.25}Nb_{2.75}O_{14}$ | — | $Na_2CO_3/0.625$ | $TiO_2/3.25$ | $Nb_2O_5/1.375$ |
| Example 7 | $Na_{0.1}Ti_{6.1}Nb_{5.9}O_{27}$ | $Na_{1.05}Ti_{3.05}Nb_{2.95}O_{14}$ | — | $Na_2CO_3/0.525$ | $TiO_2/3.05$ | $Nb_2O_5/1.475$ |
| Example 8 | $K_{3.9}Ti_{9.9}Nb_{2.1}O_{27}$ | $K_{2.95}Ti_{4.95}Nb_{1.05}O_{14}$ | — | $K_2CO_3/1.475$ | $TiO_2/4.95$ | $Nb_2O_5/0.525$ |
| Example 9 | $Na_{3.9}Ti_{9.9}Nb_2Ta_{0.1}O_{27}$ | $Na_{2.95}Ti_{4.95}NbTa_{0.05}O_{14}$ | — | $Na_2CO_3/1.475$ | $TiO_2/4.95$ | $Nb_2O_5/0.5$ $Ta_2O_5/0.025$ |
| Example 10 | $Cs_{3.9}Ti_{9.9}Nb_{2.1}O_{27}$ | $Cs_{2.95}Ti_{4.95}Nb_{1.05}O_{14}$ | — | $Cs_2CO_3/1.475$ | $TiO_2/4.95$ | $Nb_2O_5/0.525$ |
| Example 11 | $Li_{0.1}Na_{3.9}Ti_{9.9}Nb_{2.1}O_{27}$ | $Na_{2.95}Ti_{4.95}Nb_{1.05}O_{14}$ | Ion exchange | $Na_2CO_3/1.475$ | $TiO_2/4.95$ | $Nb_2O_5/0.525$ |
| Example 12 | $Na_{3.8}Ti_{9.8}Sn_{1.1}Mo_{1.1}O_{27}$ | $Na_{2.9}Ti_{4.9}Sn_{0.55}Mo_{0.55}O_{14}$ | — | $Na_2CO_3/1.475$ | $TiO_2/4.9$ | $MoO_3/0.55$ $SnO_2/0.55$ |

Comparative Examples 1 and 2

In Comparative Examples 1 and 2, in order to obtain a target compound, as starting materials, commercially available oxide and carbonate reagents shown in Table 1 (Li source, M1 source, Ti source) were provided such that a molar ratio similarly shown in Table 1 was satisfied, and a total weight was 50 g, at the same time. Next, the starting materials provided as above were mixed, and the obtained mixture was put into an agate pod for ball milling (capacity: 300 ml). Agate balls having respective diameters of 10 mm and 5 mm were placed in the pod at a number ratio of 1:1, such that a capacity of the balls was one-third of the capacity of the pod. After that, 50 ml of ethanol was put into the pod, and wet mixing was performed at 120 rpm for 60 minutes to obtain a mixture. Since the raw materials are uniformly mixed by such wet mixing, a single phase of a target crystal phase can be obtained.

Next, the thus obtained mixture was placed into an electric furnace and subjected to heat treatment by the following procedure. In Comparative Examples 1 and 2, synthesis was performed by a general solid-phase reaction method (single calcination). Calcining was performed in an air atmosphere at a temperature of 900° C. continuously for 12 hours. The thus obtained mixture was taken out from the furnace and pulverized, whereby the products of Comparative Examples 1 and 2 were synthesized.

The results showed that compounds having target element ratios were obtained.

(Powder X-Ray Diffraction Measurement)

The products of Examples 1 to 12 and Comparative Examples 1 and 2 were subjected to powder X-ray diffraction measurement by the procedure described above. The particle size distribution of the products was made uniform, and the results of the powder X-ray diffraction were analyzed by the Rietveld method. From the results, it was found that the products obtained in Examples 1 to 12 were monoclinic compounds having symmetries of the space group C2/m or Cm, as shown in FIG. 2. In order to investigate whether structural water (water of crystallization) is not included in the respective crystals, differential thermogravimetric measurement was performed in the range of room temperature to 600° C. As a result, since a change in weight due to dehydration does not occur, it was confirmed that no water of crystallization was included. The analysis results of the products such as space groups, lattice constants, and unit lattice volumes are summarized in the following Table 3.

TABLE 3

| | Crystal Phase | Space Group | Lattice Constant a | b | c | Volume V | Water of Crystallization |
|---|---|---|---|---|---|---|---|
| Comparative Example 1 | orthorhombic | Fmmm | 16.38 | 5.76 | 11.30 | 1066.14 | none |
| Comparative Example 2 | monoclinic | C2/m | 15.09 | 3.73 | 9.21 | 518.39 | none |
| Example 1 | monoclinic | C2/m | 16.02 | 3.69 | 8.92 | 527.30 | none |
| Example 2 | monoclinic | C2/m | 16.10 | 3.72 | 9.05 | 542.02 | none |
| Example 3 | monoclinic | C2/m | 16.15 | 3.76 | 9.10 | 552.59 | none |
| Example 4 | monoclinic | C2/m | 16.22 | 3.78 | 9.18 | 562.84 | none |
| Example 5 | monoclinic | C2/m | 16.28 | 3.81 | 9.15 | 567.55 | none |
| Example 6 | monoclinic | Cm | 16.31 | 3.82 | 9.17 | 571.33 | none |
| Example 7 | monoclinic | C2/m | 16.36 | 3.84 | 9.19 | 577.34 | none |
| Example 8 | monoclinic | C2/m | 16.99 | 3.79 | 9.01 | 580.17 | none |
| Example 9 | monoclinic | C2/m | 16.02 | 3.68 | 8.91 | 525.28 | none |
| Example 10 | monoclinic | C2/m | 17.20 | 3.84 | 9.11 | 601.70 | none |
| Example 11 | monoclinic | C2/m | 16.03 | 3.69 | 8.91 | 527.03 | none |
| Example 12 | monoclinic | C2/m | 16.02 | 3.70 | 8.95 | 530.50 | none |

(Examination of Compositions of Products)

Compositions of the products of Examples 1 to 12 and Comparative Examples 1 and 2 were analyzed by the ICP method described above. The results are shown in the following Table 2.

TABLE 2

| | $Li_xM1_{4-z}Ti_{10-y}M2_{2+z}O_{27+\delta}$ | | |
|---|---|---|---|
| | x | y | z |
| Comparative Example 1 | — | — | — |
| Comparative Example 2 | — | — | — |
| Example 1 | 0 | 0.1 | 0.1 |
| Example 2 | 0 | 0.5 | 0.5 |
| Example 3 | 0 | 1.0 | 1.0 |
| Example 4 | 0 | 2.0 | 2.0 |
| Example 5 | 0 | 3.0 | 3.0 |
| Example 6 | 0 | 3.5 | 3.5 |
| Example 7 | 0 | 3.9 | 3.9 |
| Example 8 | 0 | 0.1 | 0.1 |
| Example 9 | 0 | 0.1 | 0.1 |
| Example 10 | 0 | 0.1 | 0.1 |
| Example 11 | 0.1 | 0.1 | 0.1 |
| Example 12 | 0 | 0.2 | 0.2 |

(Electrochemical Measurement)

For each of the products obtained in the above examples and comparative Examples, electrochemical measurement was performed by the following procedure. Hereinafter, although an example using the product of Example 1 will be described, the products of the other examples and comparative examples were subjected to electrochemical measurement in a similar manner as the product of Example 1.

First, particles of the product of Example 1 were pulverized to have an average particle diameter of 5 μm or less to thus obtain a pulverized product. Then, acetylene black as a conductive agent was mixed at a proportion of 10 parts by mass relative to the active material to obtain a mixture. Then, the mixture was dispersed in NMP (N-methyl-2-pyrrolidone) to obtain a dispersion. Polyvinylidene fluoride (PVdF) as a binder was mixed into this dispersion at a proportion of 10 parts by mass relative to the product of Example 1 to produce an electrode slurry. The slurry was applied onto a current collector formed of aluminum foil with the use of a blade. This was dried at 130° C. for 12 hours under vacuum and thereafter roll-pressed such that a density of an electrode layer (excluding the current collector) was 2.2 g/cm³, and thus an electrode was obtained.

Using this electrode, metal lithium foil as a counter electrode, and nonaqueous electrolyte, an electrochemical measurement cell of Example 1 was produced. As the nonaqueous electrolyte, a nonaqueous electrolyte in which lithium hexafluorophosphate (LiPF$_6$) was dissolved at a concentration of 1 M in a mixed solvent (volume ratio 1:1) of ethylene carbonate and diethyl carbonate was used.

For the electrochemical measurement cell of Example 1, charge-and-discharge test was performed at room temperature. The charge-and-discharge test was conducted at a charge-and-discharge current value of 0.2 C (time discharge rate) within a potential range of 1.0 V to 3.0 V relative to a metal lithium electrode. An initial Li insertion amount in this test was defined as an initial charge capacity, and Li extraction amount was defined as an initial discharge capacity. At this time, a value obtained by dividing the initial discharge capacity by the initial charge capacity was then multiplied by 100, and the resulting value (initial discharge capacity/ initial charge capacity×100) was defined as an initial charge-and-discharge efficiency.

Next, in order to examine whether the product of Example 1 can be charged and discharged stably, for the electrochemical measurement cell of Example 1, charging and discharging were repeated for 200 cycles. One cycle included charging once and discharging once. Charging and discharging were performed at room temperature at a current value of 1 C (time discharge rate) within a potential range of 1.0 V to 3.0 V relative to the metal lithium electrode.

In order to examine a discharge capacity retention ratio after 200 cycles, for the electrochemical measurement cell of Example 1, charging and discharging were performed again at 0.2 C (time discharge rate), and the capacity retention ratio was calculated, defining the initial discharge capacity as 100%.

Further, for the electrochemical measurement cell of Example 1, a 0.2 C discharge capacity and a 20.0 C discharge capacity were measured. A discharge rate, as an indicator of rate performance, was calculated by dividing the 20.0 C discharge capacity obtained by measurement by the 0.2 C discharge capacity similarly obtained by measurement. The results are shown in Table 4. Table 4 also shows a negative electrode potential when the electrochemical measurement cell is at a state of SOC 50%.

As apparent from these results, electrode capacities of Examples 1 to 12 are higher than those of Comparative Examples 1 and 2. Thus, the products of Examples 1 to 12 can provide a battery of high electrode capacity.

Further, the rate performances of Examples 1 to 12 are higher than that of Comparative Example 1. Meanwhile, the capacity retention ratios after 200 cycles are higher than that of Comparative Example 2. In each Comparative Example, a tradeoff had occurred, where the cycle performance was low if the rate performance was high, and the rate performance was low if the cycle performance was high. Opposed to this, Examples 1 to 12 were excellent in both rate performance and cycle performance. Thus, it can be seen that in the compositions of the embodiments, quick movement of lithium ions and a stable structural framework are simultaneously exhibited.

As shown by the results, by using the compounds of the embodiments, a battery exhibiting high charge-and-discharge capacity and simultaneously having excellent rate performance and life performance can be provided.

According to the above embodiments and Examples, an active material including a composite oxide is provided. The composite oxide is represented by a general formula $Li_xM1_{4-y}Ti_{10-z}M2_{2+z}O_{27+\delta}$. Here, M1 includes at least one selected from the group consisting of Na, K, and Cs. M2 includes at least one selected from the group consisting of Zr, Sn, V, Nb, Ta, Mo, W, Fe, Co, Mn, Ni, and Al. x satisfies $0 \leq x < 18$. y satisfies $0 < y < 4$. z satisfies $0 < z < 4$. $\delta$ satisfies $-0.3 < \delta \leq 0.3$. By using this active material, there can be realized a nonaqueous electrolyte battery having a high energy density, where designing of battery voltage can be easy, and is excellent in rapid charge-and-discharge performances and life performance.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to

TABLE 4

|  | Initial Discharge Capacity (mAh/g) | Initial Charge-and-Discharge Efficiency (%) | 20 C/0.2 C Discharge Capacity Ratio (%) | Capacity Retention Ratio after 200 cycles (%) | Potential at SOC 50% (V vs. Li$^+$/Li) |
|---|---|---|---|---|---|
| Comparative Example 1 | 131.8 | 89.5 | 63.5 | 78.3 | 1.38 |
| Comparative Example 2 | 94.9 | 89.0 | 77.6 | 60.5 | 1.28 |
| Example 1 | 135.3 | 90.1 | 70.8 | 68.9 | 1.30 |
| Example 2 | 145.5 | 90.3 | 72.3 | 70.5 | 1.31 |
| Example 3 | 150.1 | 90.5 | 75.5 | 73.2 | 1.31 |
| Example 4 | 155.8 | 90.2 | 75.3 | 72.3 | 1.35 |
| Example 5 | 156.3 | 90.1 | 75.2 | 72.7 | 1.36 |
| Example 6 | 156.0 | 89.9 | 76.1 | 73.6 | 1.38 |
| Example 7 | 156.2 | 90.2 | 75.9 | 72.9 | 1.40 |
| Example 8 | 135.1 | 89.6 | 69.0 | 61.1 | 1.50 |
| Example 9 | 134.8 | 90.3 | 71.4 | 69.0 | 1.30 |
| Example 10 | 134.6 | 89.7 | 72.7 | 71.4 | 1.50 |
| Example 11 | 136.6 | 92.4 | 75.0 | 72.5 | 1.30 |
| Example 12 | 133.7 | 90.8 | 73.2 | 69.9 | 1.31 |

What is claimed is:

1. An active material comprising a composite oxide represented by a general formula $Li_xM1_{4-y}Ti_{10-z}M2_{2+z}O_{27+\delta}$, wherein M1 includes at least one selected from the group consisting of Na, K, and Cs, M2 includes at least one selected from the group consisting of Zr, Sn, V, Nb, Ta, Mo, W, Fe, Co, Mn, Ni, and Al, and $0 \leq x < 18$, $0 < y < 4$, $0 < z < 4$, and $-0.3 \leq \delta \leq 0.3$ are satisfied.

2. The active material according to claim 1, wherein the composite oxide has a monoclinic crystal structure belonging to at least one of space groups C2, Cm, and C2/m, and lattice constants of a axis, b axis, and c axis respectively satisfy $16.0 \text{ Å} \leq a \leq 21.0 \text{ Å}$, $3.5 \text{ Å} \leq b \leq 4.5 \text{ Å}$, and $8.0 \text{ Å} \leq c \leq 13.0 \text{ Å}$.

3. The active material according to claim 1, wherein in the composite oxide, a total valence of elements included in M2 is greater than a valence of 5+.

4. The active material according to claim 1, wherein the composite oxide is a substituted oxide where vacancy sites are introduced in a portion of M1 sites, and a portion of Ti sites is substituted with M2 elements in a composite oxide having a monoclinic crystal structure represented by a general formula $Li_xM1_4Ti_{10}M2_2O_{27+\delta}$.

5. The active material according to claim 1, wherein the composite oxide is represented by a general formula $Li_xNa_{4-y}Ti_{10-z}M2_{2+z}O_{27+\delta}$, wherein M2 includes at least one selected from the group consisting of Nb, Ta, Mo, Fe, and Al, and $0 \leq x < 18$, $0 < y < 4$, $0 < z < 4$, and $-0.3 < \delta \leq 0.3$ are satisfied.

6. The active material according to claim 1, wherein the composite oxide is represented by a general formula $Li_xM1_{4-y}Ti_{10-z}M2_{2+z}O_{27+\delta}$, wherein $0 \leq x < 18$, $0 < y < 4$, $0 < z < 4$, and $-0.3 < \delta \leq 0.3$ are satisfied.

7. A nonaqueous electrolyte battery comprising:
a negative electrode comprising the active material according to claim 1;
a positive electrode; and
a nonaqueous electrolyte.

8. A battery pack comprising the nonaqueous electrolyte battery according to claim 7.

9. The battery pack according to claim 8, which further comprises a protective circuit and an external power distribution terminal.

10. The battery pack according to claim 8, wherein the battery pack comprises plural nonaqueous electrolyte batteries, each according to claim 7, wherein the plural nonaqueous electrolyte batteries are electrically connected in series, in parallel, or in a combination of in series and in parallel.

11. A vehicle onto which is mounted the battery pack according to claim 8.

12. The vehicle according to claim 11, wherein the battery pack is configured to recover a regenerative energy of a power of the vehicle.

* * * * *